United States Patent
Hill et al.

(10) Patent No.: US 10,476,093 B2
(45) Date of Patent: Nov. 12, 2019

(54) MEMBRANE MODULES FOR HYDROGEN SEPARATION AND FUEL PROCESSORS AND FUEL CELL SYSTEMS INCLUDING THE SAME

(71) Applicant: Chung-Hsin Electric & Machinery Mfg. Corp., Taoyuan (TW)

(72) Inventors: Charles R. Hill, Bend, OR (US); Vernon Wade Popham, Bend, OR (US)

(73) Assignee: Chung-Hsin Electric & Machinery Mfg. Corp. (TW)

( * ) Notice: Subject to any disclaimer, the term of this patent is extended or adjusted under 35 U.S.C. 154(b) by 260 days.

(21) Appl. No.: 15/483,767

(22) Filed: Apr. 10, 2017

(65) Prior Publication Data

US 2017/0301940 A1   Oct. 19, 2017

Related U.S. Application Data

(60) Provisional application No. 62/323,478, filed on Apr. 15, 2016.

(51) Int. Cl.
*H01M 8/0662* (2016.01)
*B01D 53/22* (2006.01)
(Continued)

(52) U.S. Cl.
CPC ........ *H01M 8/0687* (2013.01); *B01D 53/227* (2013.01); *B01D 63/082* (2013.01);
(Continued)

(58) Field of Classification Search
CPC  B01D 53/22; B01D 53/227; B01D 2053/222; B01D 63/082; B01D 63/084;
(Continued)

(56) References Cited

U.S. PATENT DOCUMENTS 1,306,221 A    6/1919  Ellis
1,782,824 A    11/1930 Hechenbleikner
(Continued)

FOREIGN PATENT DOCUMENTS

CA    1238866       7/1988
EP    0434562 A1    6/1991
(Continued)

OTHER PUBLICATIONS

US 6,340,380 B1, 01/2002, Frost et al. (withdrawn)
(Continued)

*Primary Examiner* — Jason M Greene
(74) *Attorney, Agent, or Firm* — Dascenzo Intellectual Property Law, P.C.

(57) ABSTRACT

Membrane modules for hydrogen separation and fuel processors and fuel cell systems including the same are disclosed herein. The membrane modules include a plurality of membrane packs. Each membrane pack includes a first hydrogen-selective membrane, a second hydrogen-selective membrane, and a fluid-permeable support structure positioned between the first hydrogen-selective membrane and the second hydrogen-selective membrane. In some embodiments, the membrane modules also include a permeate-side frame member and a mixed gas-side frame member, and a thickness of the permeate-side frame member may be less than a thickness of the mixed gas-side frame member. In some embodiments, the support structure includes a screen structure that includes two fine mesh screens. The two fine mesh screens may include a plain weave fine mesh screen and/or a Dutch weave fine mesh screen. The fine mesh screens may be selected to provide at most 100 micrometers of undulation in the hydrogen-selective membranes.

31 Claims, 12 Drawing Sheets

(51) Int. Cl.
- *B01D 63/08* (2006.01)
- *C01B 3/50* (2006.01)
- *C01B 3/32* (2006.01)
- *C01B 3/38* (2006.01)
- *H01M 8/1018* (2016.01)

(52) U.S. Cl.
CPC .............. *C01B 3/323* (2013.01); *C01B 3/384* (2013.01); *C01B 3/505* (2013.01); *B01D 2053/221* (2013.01); *B01D 2256/16* (2013.01); *B01D 2257/502* (2013.01); *B01D 2257/504* (2013.01); *C01B 2203/0233* (2013.01); *C01B 2203/0244* (2013.01); *C01B 2203/0405* (2013.01); *C01B 2203/066* (2013.01); *C01B 2203/1217* (2013.01); *C01B 2203/1235* (2013.01); *H01M 2008/1095* (2013.01)

(58) Field of Classification Search
CPC .......... B01D 2256/16; B01D 2257/108; B01D 2313/23; H01M 8/0687
See application file for complete search history.

(56) References Cited

U.S. PATENT DOCUMENTS

| | | |
|---|---|---|
| 1,848,466 A | 3/1932 | Edmonds |
| 2,132,151 A | 10/1938 | Fenske et al. |
| 2,450,804 A | 10/1948 | Loy |
| 2,609,059 A | 9/1952 | Benedict |
| 2,824,620 A | 2/1958 | De Rosset |
| 3,094,391 A | 6/1963 | Mader |
| 3,144,312 A | 8/1964 | Mertens |
| 3,208,198 A | 9/1965 | Rubin |
| 3,238,704 A * | 3/1966 | Straschil ............... B01D 63/08 210/231 |
| 3,336,730 A | 8/1967 | McBride et al. |
| 3,338,681 A | 8/1967 | Kordesch |
| 3,344,586 A | 10/1967 | Langley et al. |
| 3,350,176 A | 10/1967 | Green et al. |
| 3,356,538 A | 12/1967 | Miekka et al. |
| 3,368,329 A | 2/1968 | Eguchi et al. |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,372 A | 9/1969 | Yamauchi et al. |
| 3,469,944 A | 9/1969 | Bocard et al. |
| 3,486,301 A | 12/1969 | Bonnet |
| 3,520,803 A | 7/1970 | Iaconelli |
| 3,522,019 A | 7/1970 | Buswell et al. |
| 3,524,819 A | 8/1970 | Guerrieri |
| 3,534,531 A | 10/1970 | Eguchi et al. |
| 3,564,819 A | 2/1971 | Neulander et al. |
| 3,589,171 A | 6/1971 | Haley |
| 3,655,448 A | 4/1972 | Setzer |
| 3,665,680 A | 5/1972 | Heuser |
| 3,713,270 A | 1/1973 | Farr et al. |
| 3,761,382 A | 9/1973 | Hammond et al. |
| 3,782,904 A | 1/1974 | Fletcher |
| 3,787,038 A | 1/1974 | Tesner et al. |
| 3,791,106 A | 2/1974 | Haley |
| 3,797,202 A * | 3/1974 | Neulander ............ B01D 63/082 96/5 |
| 3,837,146 A | 9/1974 | Faure et al. |
| 3,839,110 A | 10/1974 | Shankoff |
| 3,849,076 A | 11/1974 | Gryaznov et al. |
| 3,881,891 A | 5/1975 | Goltsov et al. |
| 3,881,897 A | 5/1975 | Faure et al. |
| 3,920,416 A | 11/1975 | Houseman |
| 3,955,941 A | 5/1976 | Houseman et al. |
| 3,972,695 A | 8/1976 | Buckley et al. |
| 3,980,452 A | 9/1976 | Krumm et al. |
| 3,982,910 A | 9/1976 | Houseman et al. |
| 4,003,343 A | 1/1977 | Lee |
| 4,003,725 A | 1/1977 | Bunn, Jr. et al. |
| 4,056,373 A | 11/1977 | Rubin |
| 4,078,985 A | 3/1978 | Takeuchi |
| 4,084,934 A | 4/1978 | Kumazawa |
| 4,098,959 A | 7/1978 | Fanciullo |
| 4,098,960 A | 7/1978 | Gagnon |
| 4,127,393 A | 11/1978 | Timmins et al. |
| 4,132,668 A | 1/1979 | Gryaznov et al. |
| 4,134,739 A | 1/1979 | Gulden et al. |
| 4,175,165 A | 11/1979 | Adlhart |
| 4,197,152 A | 4/1980 | Palty et al. |
| 4,214,969 A | 7/1980 | Lawrance |
| 4,238,403 A | 12/1980 | Pinto |
| 4,243,536 A | 1/1981 | Prölss |
| 4,248,688 A | 2/1981 | Gartner et al. |
| 4,254,086 A | 3/1981 | Sanders |
| 4,302,177 A | 11/1981 | Fankhanel et al. |
| 4,313,013 A | 1/1982 | Harris |
| 4,315,893 A | 2/1982 | McCallister |
| 4,319,923 A | 3/1982 | Falanga et al. |
| 4,329,157 A | 5/1982 | Dobo et al. |
| 4,331,520 A | 5/1982 | Juda et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,417,905 A | 11/1983 | Banks et al. |
| 4,422,911 A | 12/1983 | Juda et al. |
| 4,430,304 A | 2/1984 | Spurrier et al. |
| 4,444,158 A | 4/1984 | Yoon |
| 4,466,253 A | 8/1984 | Jaster |
| 4,468,235 A | 8/1984 | Hill |
| 4,472,176 A | 9/1984 | Rubin |
| 4,473,622 A | 9/1984 | Chludzinski et al. |
| 4,504,447 A | 3/1985 | Spurrier et al. |
| 4,533,607 A | 8/1985 | Sederquist |
| 4,553,981 A | 11/1985 | Fuderer |
| 4,567,857 A | 2/1986 | Houseman et al. |
| 4,589,891 A | 5/1986 | Iniotakis et al. |
| 4,613,436 A | 9/1986 | Wight et al. |
| 4,642,273 A | 2/1987 | Sasaki |
| 4,644,751 A | 2/1987 | Hsu |
| 4,650,814 A | 3/1987 | Keller |
| 4,654,063 A | 3/1987 | Auvil et al. |
| 4,655,797 A | 4/1987 | Iniotakis et al. |
| 4,657,828 A | 4/1987 | Tajima |
| 4,659,634 A | 4/1987 | Struthers |
| 4,670,359 A | 6/1987 | Beshty et al. |
| 4,684,581 A | 8/1987 | Struthers |
| 4,693,945 A | 9/1987 | Ohyauchi et al. |
| 4,699,637 A | 10/1987 | Iniotakis et al. |
| 4,713,234 A | 12/1987 | Weirich et al. |
| 4,751,151 A | 6/1988 | Healy et al. |
| 4,781,241 A | 11/1988 | Misage et al. |
| 4,788,004 A | 11/1988 | Pinto et al. |
| 4,810,485 A | 3/1989 | Marianowski et al. |
| 4,820,594 A | 4/1989 | Sugita et al. |
| 4,838,897 A | 6/1989 | Amano et al. |
| 4,849,187 A | 7/1989 | Uozu et al. |
| 4,865,624 A | 9/1989 | Okada |
| 4,880,040 A | 11/1989 | Pierson et al. |
| 4,904,455 A | 2/1990 | Karafian et al. |
| 4,904,548 A | 2/1990 | Tajima |
| 4,946,667 A | 8/1990 | Beshty |
| 4,981,676 A | 1/1991 | Minet et al. |
| 4,999,107 A | 3/1991 | Guerif |
| 5,030,661 A | 7/1991 | Lywood |
| 5,032,365 A | 7/1991 | Aono et al. |
| 5,051,113 A | 9/1991 | Nemser |
| 5,126,045 A | 6/1992 | Kohlheb et al. |
| 5,139,541 A | 8/1992 | Edlund |
| 5,158,581 A | 10/1992 | Coplan |
| 5,174,900 A | 12/1992 | Nichols et al. |
| 5,205,841 A | 4/1993 | Vaiman |
| 5,207,906 A | 5/1993 | Anvil et al. |
| 5,210,059 A | 5/1993 | Matturo et al. |
| 5,215,729 A | 6/1993 | Buxbaum |
| 5,217,506 A | 6/1993 | Edlund et al. |
| 5,225,080 A | 7/1993 | Karbachsch et al. |

(56) References Cited

U.S. PATENT DOCUMENTS

| | | |
|---|---|---|
| 5,226,928 A | 7/1993 | Makabe et al. |
| 5,229,102 A | 7/1993 | Minet et al. |
| 5,259,870 A | 11/1993 | Edlund |
| 5,306,577 A | 4/1994 | Sprouse |
| 5,326,550 A | 7/1994 | Adris et al. |
| 5,335,628 A | 8/1994 | Dunbar |
| 5,344,721 A | 9/1994 | Sonai et al. |
| 5,354,547 A | 10/1994 | Rao et al. |
| 5,376,167 A | 12/1994 | Broutin et al. |
| 5,382,271 A | 1/1995 | Ng et al. |
| 5,393,325 A | 2/1995 | Edlund |
| 5,395,425 A | 3/1995 | Brown |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,449,848 A | 9/1995 | Itoh |
| 5,458,857 A | 10/1995 | Collins et al. |
| 5,468,283 A | 11/1995 | French et al. |
| 5,498,278 A | 3/1996 | Edlund |
| 5,500,122 A | 3/1996 | Schwartz |
| 5,509,942 A | 4/1996 | Dodge |
| 5,516,344 A | 5/1996 | Corrigan |
| 5,518,530 A | 5/1996 | Sakai et al. |
| 5,520,807 A | 5/1996 | Myrna et al. |
| 5,525,322 A | 6/1996 | Willms |
| 5,527,632 A | 6/1996 | Gardner |
| 5,536,405 A | 7/1996 | Myrna et al. |
| 5,537,352 A | 7/1996 | Meyer et al. |
| 5,580,523 A | 12/1996 | Bard |
| 5,589,599 A | 12/1996 | McMullen et al. |
| 5,612,012 A | 3/1997 | Soma et al. |
| 5,614,001 A | 3/1997 | Kosaka et al. |
| 5,616,430 A | 4/1997 | Aoyama |
| 5,634,354 A | 6/1997 | Howard et al. |
| 5,637,259 A | 6/1997 | Galuszka et al. |
| 5,637,414 A | 6/1997 | Inoue et al. |
| 5,639,431 A | 6/1997 | Shirasaki et al. |
| 5,645,626 A | 7/1997 | Edlund et al. |
| 5,658,681 A | 8/1997 | Sato et al. |
| 5,677,073 A | 10/1997 | Kawatsu |
| 5,679,249 A | 10/1997 | Fendya et al. |
| 5,705,082 A | 1/1998 | Hinson |
| 5,705,916 A | 1/1998 | Rudbeck et al. |
| 5,712,052 A | 1/1998 | Kawatsu |
| 5,714,276 A | 2/1998 | Okamoto |
| 5,734,092 A | 3/1998 | Wang et al. |
| 5,738,708 A | 4/1998 | Peachey et al. |
| 5,741,474 A | 4/1998 | Isomura et al. |
| 5,741,605 A | 4/1998 | Gillett et al. |
| 5,759,712 A | 6/1998 | Hockaday |
| 5,780,179 A | 7/1998 | Okamoto |
| 5,782,960 A | 7/1998 | Ogawa et al. |
| 5,795,666 A | 8/1998 | Johnssen |
| 5,798,186 A | 8/1998 | Fletcher et al. |
| 5,811,065 A | 9/1998 | Sterenberg |
| 5,814,112 A | 9/1998 | Elliot et al. |
| 5,821,185 A | 10/1998 | White et al. |
| 5,833,723 A | 11/1998 | Kuwabara et al. |
| 5,858,314 A | 1/1999 | Hsu et al. |
| 5,861,137 A | 1/1999 | Edlund |
| 5,874,051 A | 2/1999 | Heil et al. |
| 5,888,273 A | 3/1999 | Buxbaum |
| 5,891,222 A | 4/1999 | Hilgendorff et al. |
| 5,897,766 A | 4/1999 | Kawatsu |
| 5,897,970 A | 4/1999 | Isomura et al. |
| 5,904,754 A | 5/1999 | Juda et al. |
| 5,931,987 A | 8/1999 | Buxbaum |
| 5,932,181 A | 8/1999 | Kim et al. |
| 5,938,800 A | 8/1999 | Verrill et al. |
| 5,944,197 A | 8/1999 | Baltzer et al. |
| 5,980,989 A | 11/1999 | Takahashi et al. |
| 5,985,474 A | 11/1999 | Chen et al. |
| 5,997,594 A | 12/1999 | Edlund et al. |
| 5,998,053 A | 12/1999 | Diethelm |
| 6,001,249 A | 12/1999 | Bailey et al. |
| 6,007,931 A | 12/1999 | Fuller et al. |
| 6,042,956 A | 3/2000 | Lenel |
| 6,045,772 A | 4/2000 | Szydlowski et al. |
| 6,045,933 A | 4/2000 | Okamoto |
| 6,054,229 A | 4/2000 | Hsu et al. |
| 6,077,620 A | 6/2000 | Pettit |
| 6,083,637 A | 7/2000 | Walz et al. |
| 6,103,028 A | 8/2000 | Juda et al. |
| 6,103,411 A | 8/2000 | Matsubayashi et al. |
| 6,152,995 A | 11/2000 | Edlund |
| 6,165,633 A | 12/2000 | Negishi |
| 6,168,650 B1 | 1/2001 | Buxbaum |
| 6,171,574 B1 | 1/2001 | Juda et al. |
| 6,180,272 B1 | 1/2001 | Byrne et al. |
| 6,183,543 B1 | 2/2001 | Buxbaum |
| 6,183,895 B1 | 2/2001 | Kudo et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,231,831 B1 | 5/2001 | Autenrieth et al. |
| 6,238,465 B1 | 5/2001 | Juda et al. |
| 6,242,120 B1 | 6/2001 | Herron |
| 6,319,306 B1* | 11/2001 | Edlund .................. B01D 63/08 55/524 |
| 6,332,913 B1 | 12/2001 | Breitschwerdt et al. |
| 6,350,297 B1 | 2/2002 | Doyle et al. |
| 6,375,906 B1 | 4/2002 | Edlund et al. |
| 6,376,113 B1 | 4/2002 | Edlund et al. |
| 6,379,524 B1 | 4/2002 | Lee et al. |
| 6,383,670 B1 | 5/2002 | Edlund et al. |
| 6,395,405 B1 | 5/2002 | Buxbaum |
| 6,419,726 B1 | 7/2002 | Frost et al. |
| 6,458,189 B1 | 10/2002 | Edlund et al. |
| 6,461,408 B2 | 10/2002 | Buxbaum |
| 6,494,937 B1 | 12/2002 | Edlund et al. |
| 6,495,277 B1 | 12/2002 | Edlund et al. |
| 6,537,352 B2 | 3/2003 | Edlund et al. |
| 6,547,858 B1 | 4/2003 | Edlund et al. |
| 6,562,111 B2 | 5/2003 | Edlund et al. |
| 6,569,227 B2 | 5/2003 | Edlund et al. |
| 6,596,057 B2 | 7/2003 | Edlund et al. |
| 6,602,325 B1 | 8/2003 | Frost et al. |
| 6,632,270 B2 | 10/2003 | Edlund et al. |
| 6,660,069 B2 | 12/2003 | Sato et al. |
| 6,719,831 B2 | 4/2004 | Edlund et al. |
| 6,719,832 B2 | 4/2004 | Edlund et al. |
| 6,723,156 B2 | 4/2004 | Edlund et al. |
| 6,761,755 B2 | 7/2004 | Jantsch et al. |
| 6,767,389 B2 | 7/2004 | Edlund et al. |
| 6,783,741 B2 | 8/2004 | Edlund et al. |
| 6,824,593 B2 | 11/2004 | Edlund et al. |
| 6,835,232 B2 | 12/2004 | Frost et al. |
| 6,890,672 B2 | 5/2005 | Dickman et al. |
| 7,056,369 B2 | 6/2006 | Beisswenger et al. |
| 7,297,183 B2 | 11/2007 | Edlund et al. |
| 7,972,420 B2 | 7/2011 | Pledger et al. |
| 8,030,600 B2 | 10/2011 | Kimura |
| 2002/0103453 A1 | 8/2002 | Burbank et al. |
| 2003/0167690 A1 | 9/2003 | Edlund et al. |
| 2004/0083890 A1 | 5/2004 | Edlund et al. |
| 2004/0126643 A1 | 7/2004 | Kinkelaar et al. |
| 2004/0148857 A1 | 8/2004 | Strizki et al. |
| 2004/0155065 A1 | 8/2004 | Kinkelaar et al. |
| 2004/0231516 A1 | 11/2004 | Edlund et al. |
| 2004/0241509 A1 | 12/2004 | Taguchi et al. |
| 2005/0039400 A1 | 2/2005 | Lau et al. |
| 2005/0188843 A1 | 9/2005 | Edlund et al. |
| 2006/0037476 A1 | 2/2006 | Edlund et al. |
| 2006/0090397 A1 | 5/2006 | Edlund et al. |
| 2016/0158693 A1* | 6/2016 | Ouchi .................. B01D 63/10 422/222 |

FOREIGN PATENT DOCUMENTS

| | | |
|---|---|---|
| EP | 1065741 A2 | 1/2001 |
| GB | 1032131 | 6/1966 |
| JP | 45-14404 | 5/1970 |

(56) References Cited

FOREIGN PATENT DOCUMENTS

| | | |
|---|---|---|
| JP | 45-2642 | 9/1970 |
| JP | 57-145276 | 9/1982 |
| JP | 1-145302 | 6/1989 |
| JP | 1-145303 | 6/1989 |
| JP | 1-262903 | 10/1989 |
| JP | 4-163860 | 6/1992 |
| JP | 4-338101 | 11/1992 |
| JP | 6-134244 | 5/1994 |
| JP | 10-263372 | 10/1998 |
| JP | 2009-280426 | 12/2009 |
| JP | 2010-137160 | 6/2010 |
| KR | 20130047207 | 5/2013 |
| WO | WO 97/25649 | 7/1997 |
| WO | WO 97/43796 | 11/1997 |
| WO | WO 99/30806 | 6/1999 |
| WO | WO 99/65097 | 12/1999 |
| WO | WO 00/04600 | 1/2000 |
| WO | WO 00/27507 | 5/2000 |
| WO | WO 01/12539 | 2/2001 |
| WO | WO 01/28662 | 4/2001 |
| WO | WO 01/64321 | 9/2001 |
| WO | WO 01/83086 | 11/2001 |

OTHER PUBLICATIONS

"USA Standard Mesh Chart", 4 pages, retrieved from http://www.dualmfg.com/PDF/USA-Standard-Mesh-Chart.pdf on Feb. 20, 2019. (Year: 2019).*
English-language abstract of Japanese Patent No. 57-145276, 1982.
English-language abstract of Japanese Patent No. 1-145302, 1989.
English-language abstract of Japanese Patent No. 1-145303, 1989.
English-language abstract of Japanese Patent No. 1-262903, 1989.
English-language abstract of Japanese Patent No. 4-163860, Jun. 1992.
English-language abstract of Japanese Patent No. 432150, 1992.
English-language abstract of Japanese Patent No. 4-338101, 1992.
English-language abstract of Japanese Patent No. 5132301, 1993.
English-language abstract of Japanese Patent No. 5147902, 1993.
English-language abstract of Japanese Patent No. 6040701, 1994.
English-language abstract of Japanese Patent No. 6-134244, 1994.
English-language abstract of Japanese Patent No. 6176779, 1994.
English-language abstract of Japanese Patent No. 6345408, 1994.
English-language abstract of Japanese Patent No. 710910, 1995.
English-language abstract of Japanese Patent No. 7057758, 1995.
English-language abstract of Japanese Patent No. 8-287932, 1996.
English-language abstract of German language PCT Patent Publication No. WO 97/43796, 1997.
English-language abstract of Great Britain Patent No. 2,305,186, 1997.
English language abstract of Japanese Patent No. 10-263372, 1998.
English-language abstract of Japanese Patent No. 11116202, 1999.
English-language abstract of German language PCT Patent Publication Serial No. WO 00/04600, Jan. 2000.
English-language abstract of German language PCT Patent Application Serial No. WO 01/64321, 2001.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Amphlett, J. C., et al., "On Board Hydrogen Purification for Steam Reformer/PEM Fuel Cell Vehicle Power Plants," Energy Progress X, Proceedings of the 10$^{th}$ World Hydrogen Energy Conference, Cocoa Beach, Florida, U.S.A., vol. 3, pp. 1681-1690 (Jun. 1994).
Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).

Chai, M., et al., "Promotion of Methane Steam Reforming Using Ruthenium-Dispersed Microporous Alumina Membrane Reactor," Chemistry Letters, The Chemical Society of Japan, pp. 41-44 (1993).
"Compact, Lightweight Fuel Reformer for Fuel Cells," Argonne National Laboratory/U.S. Department of Energy (Jul. 1996).
Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).
Edlund, David J. and William A. Pledger, "The Practical Use of Metal-Membrane Reactors for Industrial Applications," The 1995 Membrane Technology Reviews, pp. 89-97 (Nov. 1994).
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
Emonts, B., et al., "Compact Methanol Reformer Test for Fuel-Cell Powered Light-Duty Vehicles," Fifth Grove Fuel Cell Symposium, Commonwealth Institute, London, U.K., (no page No.), (Sep. 22-25, 1997).
Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).
Knapton, A. G., "Palladium Alloys for Hydrogen Diffusion Membranes," Platinum Metals Review, vol. 21, 44-50 (1977).
Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).
Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page No.), (Sep. 22-25, 1997).
Minet, R. G., et al., "Experimental Studies of A Ceramic Membrane Reactor for the Steam/Methane Reaction at Moderate Temperatures (400-700° C.)," Symposium on Natural Gas Upgrading II Presented before The Division of Petroleum Chemistry, Inc., Meeting of American Chemical Society, San Francisco, California, U.S.A., pp. 245-248 (Apr. 1992).
English-language abstract of Japanese Patent Publication No. 2009-280426A, Dec. 3, 2009.
English-language abstract of Japanese Patent Publication No. 2010-137160A, Jun. 24, 2010.
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.
Shu, J., et al., "Catalytic Palladium-Based Membrane Reactors: A Review," The Canadian Journal of Chemical Engineering, vol. 69, pp. 1036-1060 (Oct. 1991).
Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).
English-language abstract of Korean Patent Publication No. 20130047207, May 5, 2013.

* cited by examiner

MEMBRANE MODULES FOR HYDROGEN SEPARATION AND FUEL PROCESSORS AND FUEL CELL SYSTEMS INCLUDING THE SAME

RELATED APPLICATION

This application claims priority to U.S. Provisional Patent Application No. 62/323,478 entitled MEMBRANE-BASED HYDROGEN PURIFIERS, which was filed on Apr. 15, 2016, and the complete disclosure of which is hereby incorporated by reference.

FIELD OF THE DISCLOSURE

The present disclosure is directed to membrane modules for hydrogen separation and to fuel processors and fuel cell systems including the membrane modules.

BACKGROUND OF THE DISCLOSURE

Purified hydrogen gas is used in the manufacture of many products including metals, edible fats and oils, and semiconductors and microelectronics. Purified hydrogen gas also is an important fuel source for many energy-conservation devices. For example, fuel cells utilize purified hydrogen gas and an oxidant to produce an electric current. Various processes and devices may be used to produce hydrogen gas. However, many hydrogen-producing processes produce an impure hydrogen gas stream, which also may be referred to as a reformate stream and/or as a mixed gas stream that contains hydrogen gas and other gases. Prior to delivering this impure hydrogen stream to a fuel cell stack or other hydrogen-consuming device, the mixed gas stream may be purified, such as to remove at least a portion of the other gases.

Separation assemblies, which may include and/or may be referred to herein as separation regions, hydrogen purifiers, and/or as hydrogen separation assemblies, may be utilized to facilitate this purification. Such separation assemblies may include one or more hydrogen-selective membranes arranged within a membrane module. The hydrogen-selective membranes may be permeable to hydrogen gas but impermeable, or at least substantially impermeable, to the other gases. Such hydrogen-selective membranes also may be referred to herein as membranes.

The separation assembly may be configured to flow the mixed gas stream past a first, or mixed gas, face, or side, of the hydrogen-selective membranes, and the hydrogen gas may diffuse through the hydrogen-selective membranes to a second, or permeate, face, or side, of the hydrogen-selective membranes. Purified hydrogen gas then may be collected from the permeate side of the hydrogen-selective membranes. A portion of the mixed gas stream that does not diffuse through the hydrogen-selective membranes, which includes a substantial portion of the other gases, may be discharged from the separation assembly as a byproduct stream.

Hydrogen-selective membranes generally are formed from a noble metal, such as palladium, a palladium alloy, and/or a palladium-copper (Pd—Cu) alloy, and these noble metals are costly to obtain. In addition, a diffusion rate of hydrogen gas through the hydrogen-selective membranes may be proportional to a thickness of, or a distance that the hydrogen gas must diffuse through, the hydrogen-selective membranes. As such, it may be desirable to decrease a thickness of the hydrogen-selective membranes and/or to utilize hydrogen-selective membranes that are very thin, with conventional hydrogen-selective membranes generally having a thickness of 15-25 microns.

Utilizing a thinner hydrogen-selective membrane increases a volume of hydrogen gas that may be separated for a given pressure differential across the hydrogen-selective membrane and for a fixed concentration of hydrogen gas on the mixed gas face of the hydrogen-selective membrane. This, in turn, permits a reduction in the total area of hydrogen-selective membrane needed to obtain a desired, target, or designed, flow rate, or volume, of hydrogen gas from separation assemblies that utilize hydrogen-selective membranes. Thus, thinner membranes decrease a total mass, or volume, of noble metal needed to obtain the desired flow rate of hydrogen gas from the separation assembly, thereby decreasing an overall cost of the separation assembly.

While Pd—Cu hydrogen-selective membranes thinner than 15 microns exist, they may be challenging to incorporate into membrane-based hydrogen separation assemblies due to the fragility of the membranes. This difficulty may be due to the likelihood of irreversible mechanical damage to the thin membrane, which may be caused by a membrane support that supports the membrane during use and/or thermal cycling of the separation assembly, and/or by mechanical loading of components in the separation assembly. Various membrane supports have been utilized for supporting thinner membranes in the hydrogen separation devices, but they have been proven to be cost-prohibitive and/or difficult to implement. Thus, there exists a need for improved membrane modules for hydrogen separation.

SUMMARY OF THE DISCLOSURE

Membrane modules for hydrogen separation and fuel processors and fuel cell systems including the same are disclosed herein. The membrane modules include a plurality of membrane packs, which may be or include a stack of membrane packs and which may be disposed adjacent one another. Each membrane pack includes a first hydrogen-selective membrane, a second hydrogen-selective membrane, and a fluid-permeable support structure positioned between the first hydrogen-selective membrane and the second hydrogen-selective membrane.

In some embodiments, the membrane modules also include at least one permeate-side frame member and at least one mixed gas-side frame member. A thickness of the permeate-side frame member may be less than a thickness of the mixed gas-side frame member.

In some embodiments, the support structure includes a screen structure that includes two fine mesh screens. The two fine mesh screens may include a plain weave fine mesh screen and/or a Dutch weave fine mesh screen. The fine mesh screens may be selected to provide at most 100 micrometers of undulation within the first hydrogen-selective membrane and also within the second hydrogen-selective membrane.

DETAILED DESCRIPTION AND BEST MODE OF THE DISCLOSURE

Figure 1:
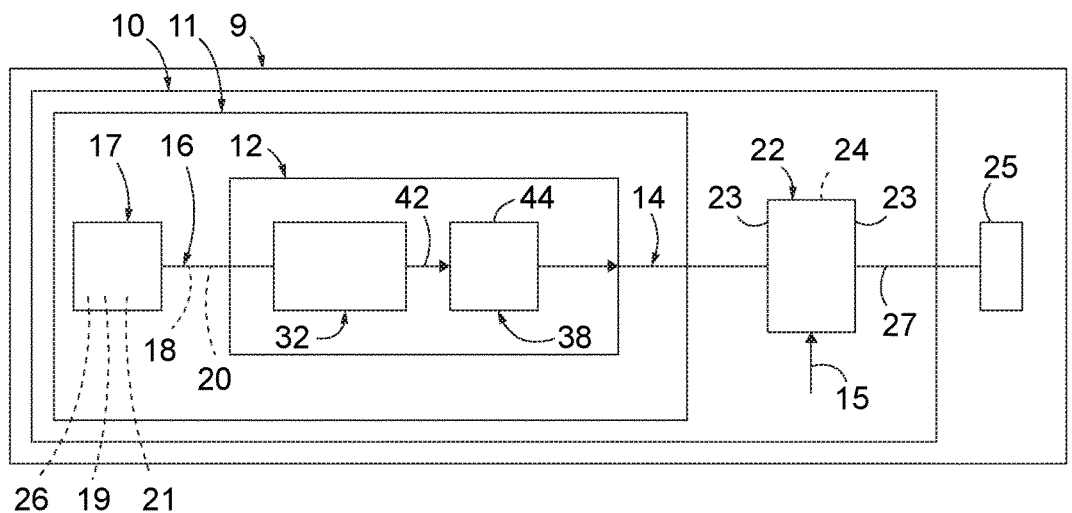
FIG. 1 is a schematic diagram illustrating examples of fuel cell systems containing a fuel processor and a hydrogen purifier according to the present disclosure.

FIGS. 1-14 provide examples of membrane modules 44, of hydrogen purifiers 38 and/or fuel processors 12 including and/or utilizing membrane modules 44, and/or of fuel cell systems 10 including and/or utilizing membrane modules 44, according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 illustrates examples of a fuel cell system 10 that may include and/or utilize a membrane module 44 according to the present disclosure. Fuel cell system 10 also may be referred to herein as a system 10 and includes at least one fuel processor 12 and at least one fuel cell stack 22. Fuel processor 12 is configured to produce a product hydrogen stream 14 containing hydrogen gas from a feed stream 16 containing a feedstock 18. The fuel cell stack is configured to produce an electric current 27 from the portion of product hydrogen stream 14 delivered thereto and an oxidant, such as oxygen gas, 15.

Fuel processor 12 is configured to produce hydrogen gas through any of a number of suitable hydrogen-producing mechanisms. Examples of suitable hydrogen-producing mechanisms include steam reforming and autothermal reforming, in which reforming catalysts are used to produce hydrogen gas from feed stream 16 that includes feedstock 18 and water 20. In this configuration, feedstock 18 also may be referred to herein as, or may be, a carbon-containing feedstock 18. Other suitable mechanisms for producing hydrogen gas include pyrolysis and catalytic partial oxidation of the carbon-containing feedstock, in which case the feed stream does not include water.

Examples of suitable carbon-containing feedstocks include at least one hydrocarbon or alcohol. Examples of suitable hydrocarbons include methane, propane, natural gas, diesel, kerosene, gasoline, and the like. Examples of suitable alcohols include methanol, ethanol, and polyols, such as ethylene glycol, and/or propylene glycol.

Feed stream 16 may be delivered to fuel processor 12 through one or more feed streams. When carbon-containing feedstock 18 is miscible with water, the feedstock may be delivered with water 20 of feed stream 16, such as shown in FIG. 1. When carbon-containing feedstock 18 is immiscible, or only slightly miscible, with water, these components typically are delivered to fuel processor 12 as, or in, separate, or distinct, feed streams as indicated in dashed lines in FIG. 1. Separate feed streams, when utilized, may be combined within the fuel processor. In a further example, the carbon-containing feedstock and water may be vaporized and delivered as a single feed stream.

In FIG. 1 feed stream 16 is shown being delivered to fuel processor 12 by a feed stream delivery system 17. Feed stream delivery system 17 also may be referred to herein as a delivery system 17 and may include one or more pumps 21. Pumps 21, when present, may deliver the components of feed stream 16 from a supply 19. Delivery system 17 additionally or alternatively may include a valve assembly 26 configured to regulate the flow of the components of feed stream 16 from at least one pressurized supply 19. Supply 19 may be located external of fuel cell system 10, and/or may be contained within, or adjacent, the fuel cell system.

Fuel processor 12 includes a hydrogen-producing region 32 and a hydrogen purifier 38 that includes a membrane module 44. As discussed in more detail herein, the hydrogen-producing region produces a hydrogen-rich stream 42 that contains hydrogen gas and other gases. Hydrogen-purifier 38 receives at least a portion of the hydrogen-rich stream, which also may be referred to as a mixed gas stream 42 and by utilizing membrane module 44, produces product hydrogen stream 14 that contains pure, or substantially pure, hydrogen gas. Hydrogen purifier 38 also produces a byproduct stream 40 that contains at least a substantial portion, if not all or nearly all, of the other gases. Examples of these other gases include carbon dioxide, carbon monoxide, unreacted feedstock, and methane. The byproduct stream also may include hydrogen gas, but at a lower purity and concentration than in product hydrogen stream 14.

Fuel cell stack 22 contains at least one, and typically multiple, fuel cells 24 that are configured to produce an electric current from the portion of the product hydrogen stream 14 delivered thereto and an oxidant 15, such as oxygen gas. Fuel cell stack 22 typically includes multiple fuel cells 24 joined together between common end plates 23, which may include fluid delivery/removal conduits. Examples of suitable fuel cells include proton exchange membrane (PEM) fuel cells and alkaline fuel cells. Fuel cell stack 22 may receive all of product hydrogen stream 14. Some or all of product hydrogen stream 14 additionally or alternatively may be delivered, via a suitable conduit, for use in another hydrogen-consuming process, burned for fuel or heat, and/or stored for later use.

This electric current produced by fuel cell stack 22 may be used to satisfy the energy demands, or applied load, of an energy-consuming device 25. Illustrative examples of energy-consuming devices 25 include a motor vehicle, recreational vehicle, boat, tool, or lighting assemblies, appliances (such as household or other appliances), dwelling, building, signaling equipment, communication equipment, etc. A fuel cell system 10 that includes or is otherwise connected with an energy-consuming device 25 may be referred to as an energy-consuming and producing device 9. Hydrogen purifiers 38 may be utilized to produce purified hydrogen gas from a source other than fuel processor 12 without departing from the scope of the present disclosure, such as stored gas containing hydrogen gas and mixed gas or an impure hydrogen gas stream from an industrial or commercial process. Hydrogen purifier 38 and/or fuel processor 12 also may be utilized separate from a fuel cell stack, such as to produce product hydrogen stream 14 for storage or use for other hydrogen-consuming devices or processes. When utilized independent of a fuel cell stack 22, fuel processor 12 and hydrogen purifier 38 may be referred to as a fuel processing system 11.

Figure 2:
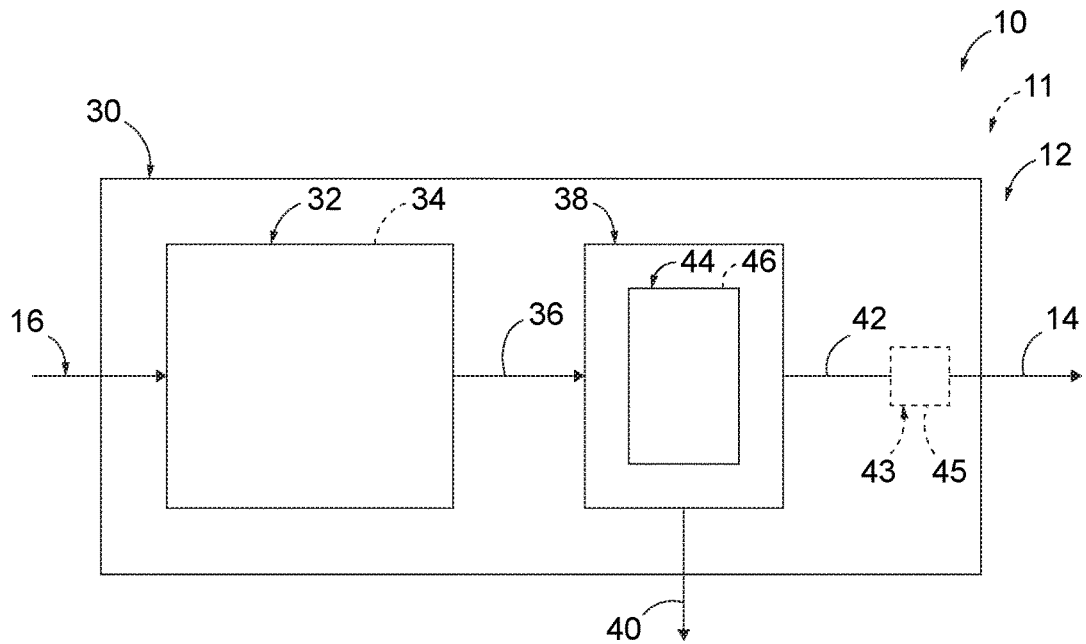
FIG. 2 is a schematic diagram of examples of fuel processors suitable for use in the fuel cell systems of FIG. 1.

As discussed, one example of a suitable fuel processor 12 is a steam reformer. An example of a suitable steam reformer is shown in FIG. 2 and indicated generally at 30. Steam reformer 30 also may be referred to herein as a reformer 30 and includes a reforming, or hydrogen-producing, region 32 that includes a steam reforming catalyst 34. Alternatively, reformer 30 may be an autothermal reformer that includes an autothermal reforming catalyst. In reforming region 32, a reformate stream 36 is produced from the water and carbon-containing feedstock forming feed stream 16. The reformate stream also may be referred to herein as a mixed gas stream 36 and generally contains hydrogen gas and impurities, or other gases. The reformate stream generally is delivered to a hydrogen purifier 38. When utilized as a component of fuel processor 12, hydrogen purifier 38 may be referred to herein as a purification region 38, a separation region 38 and/or, a separation assembly 38. As discussed, hydrogen purifier 38 is configured to receive reformate stream 36 and to produce and/or generate a hydrogen-rich stream 42, which also may be referred to herein as a product hydrogen stream 42 and/or as a purified hydrogen stream 42, and one or more byproduct streams 40 therefrom.

Hydrogen purifier 38 may utilize any suitable pressure-driven separation process. In FIG. 2, hydrogen-rich stream 42 is illustrated as forming product hydrogen stream 14, which may be provided to a fuel cell stack, as discussed herein with reference to FIG. 1 In the present disclosure, hydrogen purifier 38 includes membrane module 44, which includes one or more hydrogen-selective membranes 46.

Hydrogen purification using one or more hydrogen-selective membranes is a pressure driven separation process in which the one or more hydrogen-selective membranes are contained in a pressure vessel. The mixed gas stream contacts the mixed gas surface of the membrane(s), and the product hydrogen stream is formed from at least a portion of the mixed gas stream that permeates through the membrane(s). The byproduct stream is formed from at least a portion of the mixed gas stream that does not permeate through the membrane(s). The pressure vessel is typically sealed to prevent gases from entering or leaving the pressure vessel except through defined inlet and outlet ports, or conduits.

Hydrogen purifiers 38 and/or membrane modules 44 thereof may be configured to produce pure, or at least substantially pure, hydrogen gas. As used herein, substantially pure hydrogen gas may be greater than 90% pure, greater than 95% pure, greater than 99% pure, greater than 99.5% pure, and/or greater than 99.9% pure.

In certain circumstances, it may be desirable to further purify, or polish, hydrogen-rich stream 42 to produce and/or generate product hydrogen stream 14. In these instances, and as illustrated in dashed lines in FIG. 2, fuel processor 12 further may include a polishing region 43. Polishing region 43, when present, receives hydrogen-rich stream 42 from hydrogen purifier 38 and further purifies the hydrogen-rich stream by reducing a concentration of, or removing, selected components therein, thereby producing product hydrogen stream 14.

For example, when hydrogen-rich stream 42 is intended for use in a fuel cell stack, such as fuel cell stack 22 of FIG. 1, compositions that may damage the fuel cell stack, such as carbon monoxide and carbon dioxide, may be removed from the hydrogen-rich stream, if necessary. The concentration of carbon monoxide may be less than 10 ppm (parts per million) to prevent a control system from isolating the fuel cell stack, such as to prevent damage to the fuel cell stack and/or to prevent poisoning of a catalyst that is present within the fuel cell stack. For example, the system may limit the concentration of carbon monoxide to less than 5 ppm, or even less than 1 ppm. The concentration of carbon dioxide may be greater than that of carbon monoxide. For example, concentrations of less than 25% carbon dioxide may be acceptable. For example, the concentration of carbon dioxide may be less than 10%, or even less than 1%. Concentrations of carbon dioxide may be less than 50 ppm. It should be understood that the concentrations presented herein are illustrative examples, and that concentrations other than those presented herein may be used and are within the scope of the present disclosure. For example, particular users or manufacturers may require minimum or maximum concentration levels or ranges that are different than those identified herein.

Polishing region 43 may include any suitable structure for removing or reducing the concentration of the selected compositions in hydrogen-rich stream 42. For example, when the product stream is intended for use in a proton exchange membrane (PEM) fuel cell stack or other device that will be damaged if the stream contains more than determined concentrations of carbon monoxide or carbon dioxide, it may be desirable to include at least one methanation catalyst bed 45. Methanation catalyst bed 45 converts carbon monoxide and carbon dioxide into methane and water, both of which will not damage a PEM fuel cell stack. Polishing region 43 additionally or alternatively may include another hydrogen-producing region, such as another reforming catalyst bed, to convert any unreacted feedstock into hydrogen gas. When both a (second or further) reforming catalyst bed and a methanation catalyst bed are present in a polishing region 43, the reforming catalyst bed may be upstream from the methanation catalyst bed so as not to reintroduce carbon dioxide or carbon monoxide downstream of the methanation catalyst bed.

Figure 3:
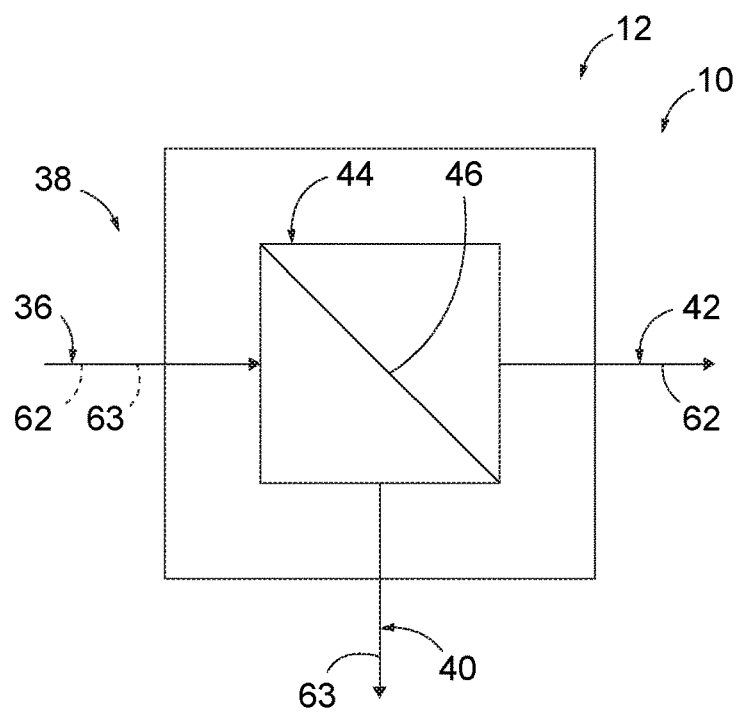
FIG. 3 is a schematic diagram illustrating examples of purification regions for a fuel processor that includes a hydrogen purifier according to the present disclosure.

An example of a membrane module 44 configured for use as a, or in a, hydrogen purifier is schematically illustrated in FIG. 3. Thus, hydrogen purifier 38 may form the entirety of a membrane module 44, or the membrane module may include additional structure and/or components. As shown, a reformate stream 36 containing hydrogen gas 62 and other gases 63 is delivered to a hydrogen purifier 38 that includes a membrane module 44 according to the present disclosure. The membrane module contains at least one hydrogen-selective membrane 46, and separates the mixed gas stream into a hydrogen-rich stream 42, containing at least substantially pure hydrogen gas 62, and a byproduct stream 40, containing other gases 63. Another way to describe the hydrogen purifier is that the hydrogen-rich stream contains at least a substantial portion, or a majority, of the hydrogen gas in the mixed gas stream and that the byproduct stream contains at least a substantial portion, or a majority, of the other gases. Stated yet another way, a concentration of hydrogen within the hydrogen-rich stream may be greater than a concentration of hydrogen in the reformate stream. Similarly, a concentration of other gases in the product hydrogen stream may be less than a concentration of hydrogen in the reformate stream. Hydrogen purifier 38 may be integrated with a hydrogen-producing device, such as a fuel processor, to provide the hydrogen-producing device with integrated hydrogen purification. Additionally or alternatively, hydrogen purifier 38 may be integrated with a hydrogen-consuming device, such as a fuel cell, to provide the hydrogen-consuming device with integrated hydrogen purification.

Figure 4:
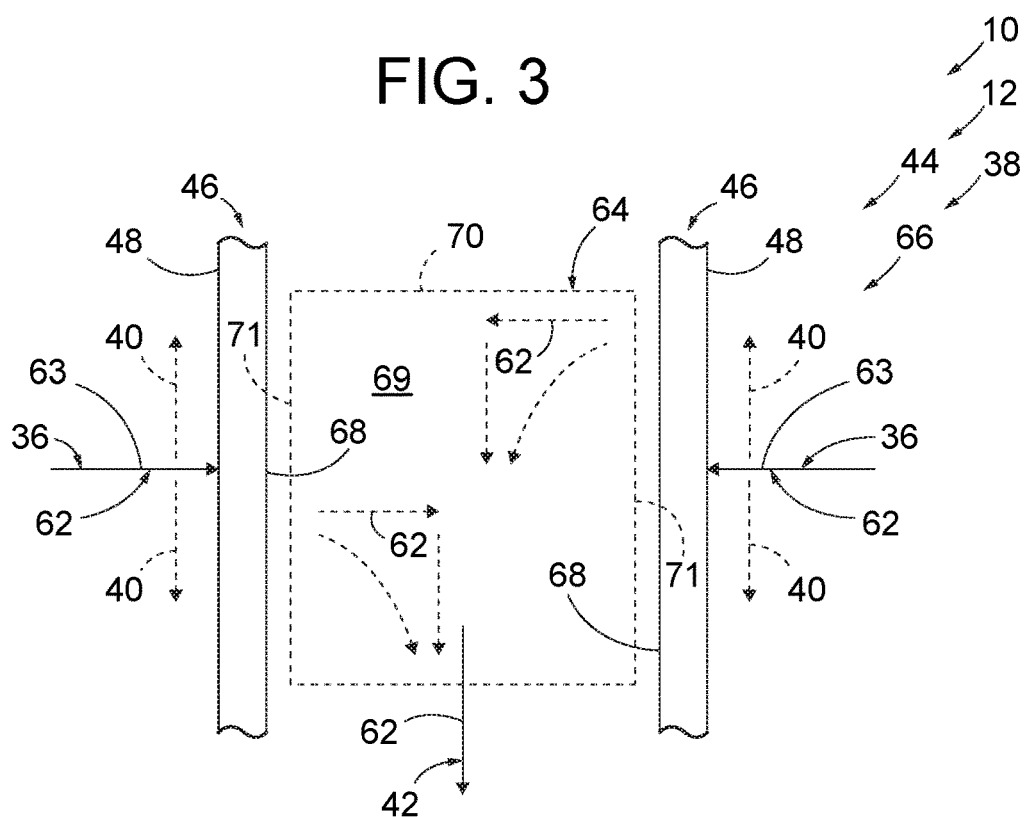
FIG. 4 is a fragmentary side elevation view illustrating examples of membrane packs for use in a hydrogen purifier according to the present disclosure.

Another example of a membrane module 44 for purification of hydrogen gas is illustrated in FIG. 4. As illustrated in FIG. 4, membrane modules 44 include at least two hydrogen-permeable, or hydrogen-selective, membranes 46. The hydrogen-selective membranes are arranged in pairs around a common support structure, or fluid-permeable support structure, 64 to form a membrane pack 66. Membrane module 44 may include a plurality of membrane packs 66, which may be stacked or otherwise arranged.

Support structure 64 defines surfaces 71, and each surface 71 supports a corresponding hydrogen-selective membrane 46. The support structure may include, or be formed from, one or more screen structures 70, as discussed in more detail herein.

Each hydrogen-selective membrane 46 includes a permeate face 68 that faces toward and/or is supported by support structure 64. Permeate faces 68 at least partially surround, or define, a harvesting conduit 69 of the membrane module. Harvesting conduit 69 also may be referred to herein as a permeate region 69 of the membrane module.

During operation of membrane module 44, a reformate stream 36 flows in fluid contact with a mixed gas face 48 of hydrogen-selective membranes 46. Mixed gas face 48 also may be referred to herein as a mixed gas-facing region 48, as a reformate face 48, and/or as a reformate-facing region 48 of hydrogen-selective membranes 46. The reformate stream may include hydrogen gas 62 and other gases 63, as discussed in more detail herein. The hydrogen gas may diffuse through hydrogen-selective membranes 46 and into harvesting conduit 69, where it may be removed from the membrane module as a hydrogen-rich stream 42. In contrast, the other gases may not diffuse through the hydrogen-selective membranes and/or may be removed from the membrane module as a byproduct stream 40.

Examples of suitable materials for hydrogen-selective membranes are noble metals, palladium, palladium alloys, and palladium-copper (Pd—Cu) alloys. In general, thin films of such metals and metal alloys are utilized as hydrogen-selective membranes. To decrease membrane cost, the palladium (or other noble metal) alloy content as well as the thickness of the membrane may be low.

In the present disclosure, thin hydrogen-selective membranes are understood to be hydrogen-selective membranes that have a thickness of less than 25 microns. As examples, the hydrogen-selective membranes may have a thickness of at most 25 microns, at most 20 microns, at most 15 microns, at most 10 microns, at most 5 microns, at least 1 micron, at least 2 microns, at least 4 microns, at least 6 microns, at least 8 microns, at least 10 microns, and/or at least 12 microns.

The hydrogen-selective membranes may have any suitable composition. As examples, the hydrogen-selective membranes may include Pd—Cu alloys with a copper composition of at least 15 weight percent (wt %), at least 20 wt %, at least 25 wt %, at least 30 wt %, at least 35 wt %, at least 40 wt %, at least 45 wt %, at least 50 wt %, at most 60 wt %, at most 55 wt %, at most 53 wt %, at most 50 wt %, at most 45 wt %, at most 40 wt %, at most 35 wt %, at most 30 wt %, and/or at most 25 wt %. It is within the scope of the present disclosure that the hydrogen-selective membranes may be formed from hydrogen-selective metals and metal alloys other than those discussed above. Examples of such hydrogen-selective metal alloys include palladium alloys, (including binary and ternary palladium alloys), palladium-silver alloys, palladium-yttrium alloys, and/or palladium-ruthenium alloys.

Additional examples of hydrogen processing assemblies, of hydrogen-producing systems, of fuel processors, and/or of fuel cell systems that may be included in and or utilized with the systems disclosed herein are disclosed in U.S. Pat. No. 7,972,420, the complete disclosure of which is hereby incorporated by reference.

Figure 5:
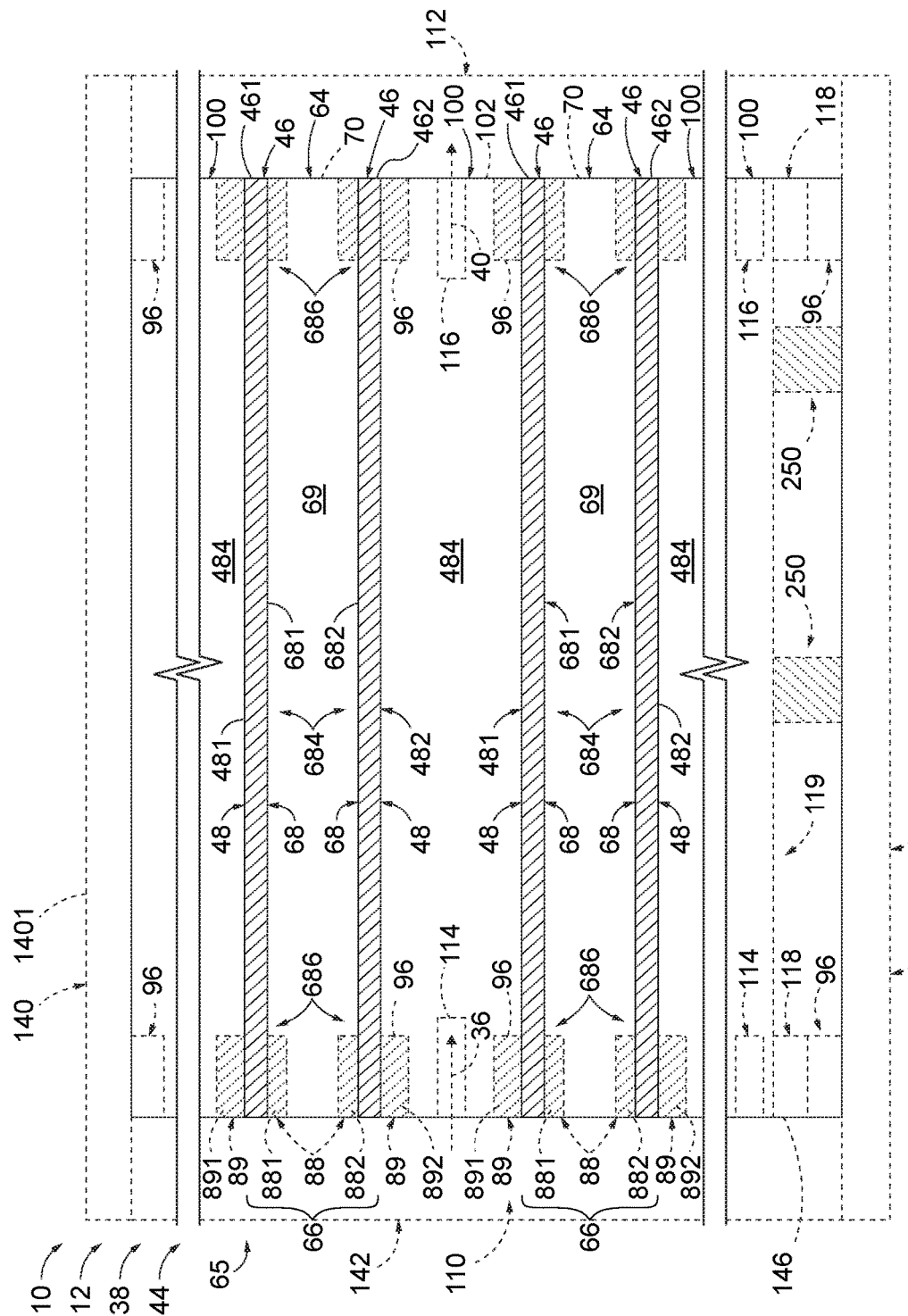
FIG. 5 is a schematic representation illustrating examples of membrane packs according to the present disclosure.

FIG. 5 is a schematic representation illustrating examples of membrane modules 44 according to the present disclosure. Membrane modules 44 that are illustrated in FIG. 5 may include, or be, more detailed illustrations of membrane modules 44 that are illustrated in FIGS. 1-4; and any of the structures, functions, and/or features discussed herein with reference to membrane modules 44 of FIG. 5 may be included in and/or utilized with membrane modules 44 of FIGS. 1-4 without departing from the scope of the present disclosure. Similarly, any of the structures, functions, and/or features discussed herein with reference to membrane modules 44, fuel cell systems 10, fuel processors 12, and/or hydrogen purifiers 38 of FIGS. 1-4 may be included in and/or utilized with membrane modules 44 of FIG. 5 without departing from the scope of the present disclosure.

Membrane modules 44, which are disclosed herein, may include and/or be modular components that individually may be manufactured and subsequently installed within any suitable assembly and/or system where hydrogen purification is desired. Additionally or alternatively, membrane modules 44 simply may refer to, or be, sections and/or components of such systems and may be manufactured concurrently with and/or integrated into any suitable component and/or structure of such systems. Examples of such systems include energy-consuming and producing devices 9, fuel cell systems 10, and/or fuel processing systems 11, which are disclosed herein.

As illustrated in FIG. 5, membrane modules 44 include a stack 65 of membrane packs 66 disposed and/or positioned adjacent one another. Stated another way, membrane modules 44 include a plurality of membrane packs 66. Each membrane pack 66 includes a plurality of hydrogen-selective membranes 46 including a first hydrogen-selective membrane 461 and a second hydrogen-selective membrane 462. Each hydrogen-selective membrane 46 defines a permeate face 68 and a mixed gas face 48. First hydrogen-selective membranes 461 may be referred to herein as defining a first permeate face 681 and an opposed first mixed gas face 481. Similarly, second hydrogen-selective membranes 462 may be referred to herein as defining a second permeate face 682 and an opposed second mixed gas face 482.

Membrane modules 44 also include a support structure 64 positioned between the first hydrogen-selective membrane and the second hydrogen-selective membrane. Support structure 64 may include, be, and/or be referred to herein as a fluid-permeable support structure 64 and is configured to physically contact, and support, at least a central region 684 of first permeate face 681 and of second permeate face 682. In addition, the support structure maintains a spaced-apart relationship between the central region of the first permeate face and the central region of the second permeate face.

As illustrated in dashed lines in FIG. 5, membrane packs 66 of membrane modules 44 also may include a plurality of permeate-side frame members 88 and a plurality of mixed gas-side frame members 89. The plurality of permeate-side frame members may include a first permeate-side frame member 881 and a second permeate-side frame member 882. Similarly, the plurality of mixed gas-side frame members may include a first mixed gas-side frame member 891 and a second mixed gas-side frame member 892.

First permeate-side frame member 881 may be interposed, or positioned, between first hydrogen-selective membrane 461 and support structure 64 such that the first permeate-side frame member physically contacts, and supports, a peripheral region 686 of first permeate face 681 and of support structure 64. Similarly, second permeate-side frame member 882 may be interposed, or positioned, between second hydrogen-selective membrane 462 and support structure 64 such that the second permeate-side frame member physically contacts, and supports a peripheral region of second permeate face 682 and of support structure 64. First mixed gas-side frame member 891 may be positioned to physically contact, and support, a peripheral region of first mixed gas face 481, while second mixed gas-side frame member 892 may be positioned to physically contact, and support, a peripheral region of second mixed gas face 482.

The frame members disclosed herein, including permeate-side frame members 88 and/or mixed gas-side frame members 89 may include and/or be gaskets and/or seals that may be configured to form various fluid seals within membrane modules 44 and/or within membrane packs 66 thereof. With this in mind, the permeate-side frame members and/or the mixed gas-side frame members also may be referred to herein as, may include, and/or may be sealing members, gaskets, and/or graphite gaskets. Stated another way, the first permeate-side frame member may be configured to form a fluid seal between the peripheral region of the first permeate face of the first hydrogen-selective membrane and the peripheral region of the support structure. Similarly, the second permeate-side frame member may be configured to form a fluid seal between the peripheral region of the second permeate face of the second hydrogen-selective membrane and the peripheral region of the support structure.

It is within the scope of the present disclosure that the permeate-side frame members 88 and mixed gas-side frame members 89 may be formed of the same or different materials, may have the same densities, and/or may have the same thicknesses. It also is within the scope of the present disclosure that a thickness of permeate-side frame members 88 may differ from a thickness of mixed gas-side frame members 89. As more specific examples, the thickness of first permeate-side frame member 881 may be less than a thickness of first mixed gas-side frame member 891 and/or a thickness of second permeate-side frame member 882 may be less than a thickness of second mixed gas-side frame member 892. This difference in thickness may decrease stress on and/or deformation of hydrogen-selective membranes 46, is illustrated in more detail in FIG. 11, and is discussed in more detail herein with reference thereto.

The thickness of the permeate-side frame members may differ from the thickness of the mixed gas-side frame members by any suitable amount. As examples, the thickness of the permeate-side frame members may be less than 95%, less than 90%, less than 85%, less than 80%, less than 75%, less than 70%, less than 65%, less than 60%, less than 55%, less than 52%, less than 50%, and/or less than 45% of the thickness of the mixed gas-side frame members.

Examples of the thickness of the permeate-side frame members include thicknesses of at least 0.05 millimeters (mm), at least 0.075 mm, at least 0.1 mm, or at least 0.125 mm, at most 0.25 mm, at most 0.20 mm, at most 0.175 mm, at most 0.15 mm, and/or at most 0.125 mm. Examples of the thickness of the mixed gas-side frame members include thicknesses of at least 0.15 millimeters (mm), at least 0.2 mm, at least 0.25 mm, or at least 0.3 mm, at most 0.6 mm, at most 0.5 mm, at most 0.45 mm, at most 0.4 mm, and/or at most 0.35 mm.

It is additionally or alternatively within the scope of the present disclosure that a density of the permeate-side frame members may differ from a density of the mixed gas-side frame members. As an example, the density of the mixed gas-side frame members may be less than a threshold fraction of the density of the permeate-side frame members. Examples of the threshold fraction include threshold fractions of 95%, 90%, 85%, 80%, 78%, 75%, 70%, and/or 65%. Such a configuration may facilitate assembly of membrane modules 44 and/or may permit compression of membrane packs 66, when assembled into membrane modules 44, in a manner that does not damage hydrogen-selective membranes 46.

Examples of the density of the permeate-side frame members include densities of at least 0.7 gram per cubic centimeter (g/cc), at least 0.8 g/cc, at least 0.9 g/cc, at least 1.0 g/cc, at least 1.1 g/cc, at least 1.2 g/cc, at least 1.3 g/cc, at least 1.4 g/cc, at least 1.5 g/cc, at most 1.8 g/cc, at most 1.7 g/cc, at most 1.6 g/cc, at most 1.5 g/cc, and/or at most 1.4 g/cc. Examples of the density of the mixed gas-side frame members include densities of at least 0.7 g/cc, at least 0.8 g/cc, at least 0.9 g/cc, at least 1 g/cc, at least 1.1 g/cc, at least 1.2 g/cc, at most 1.4 g/cc, at most 1.3 g/cc, at most 1.2 g/cc, at most 1.1 g/cc, and/or at most 1 g/cc.

Support structure 64 may include and/or be any suitable structure that may be positioned between the first hydrogen-selective membrane and the second hydrogen-selective membrane, that may maintain the spaced-apart relationship between the first hydrogen-selective membrane and the second hydrogen-selective membrane, and/or that may be fluid-permeable. Additionally or alternatively, support structure 64 may at least partially form and/or define a harvesting conduit 69 through which hydrogen gas, which permeates through hydrogen-selective membranes 46 from mixed gas region 484, may flow and/or from which the hydrogen gas may be collected. Harvesting conduit 69 also may be referred to herein as a permeate region 69.

Figure 6:
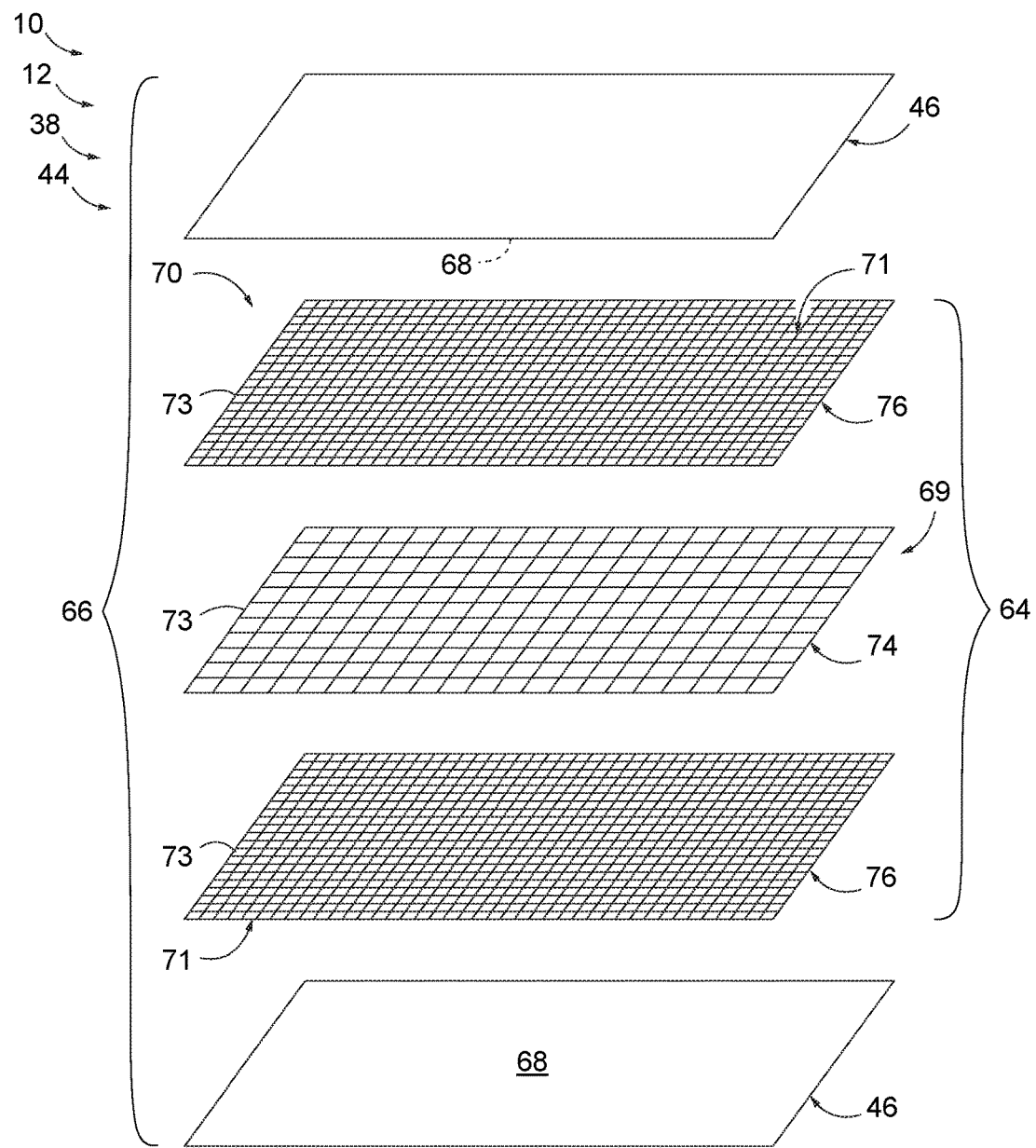
FIG. 6 is an exploded isometric view illustrating examples of a membrane pack including a support structure, according to the present disclosure, that includes a plurality of screen members.

An example of support structure 64 includes a screen structure 70, which is illustrated schematically in FIG. 5 and less schematically in FIG. 6. As illustrated in FIG. 6, screen structure 70 may include a plurality of screen members 73. The plurality of screen members may include at least a coarse mesh screen 74 and/or a fine mesh screen 76. In one embodiment, screen structure 70 includes two fine mesh screens 76 positioned next to one another, or layered upon one another. In another embodiment, a coarse mesh screen, or a coarse planar mesh screen, 74 is positioned between the two fine mesh screens. Surfaces 71 of support structure 64 may support corresponding permeate faces 68 of hydrogen-selective membranes 46, as discussed herein. In addition, screen structures 70 may permit fluid flow, within harvesting conduit 69, in directions that are both parallel and perpendicular to permeate faces 68 of hydrogen-selective membranes 46.

It should be understood that the terms "fine" and "coarse" are relative terms. Because the screen structure needs to provide for flow of the permeated gas generally parallel to the membranes, a relatively coarser inner screen member may be used to provide for enhanced parallel flow conduits. In other words, the finer mesh screens provide better protection for the membranes, while the coarser mesh screen provides better flow generally parallel to the membranes. It is within the scope of the present disclosure that coarse mesh screen 74 may be formed from a coarse wire having a coarse wire diameter, while fine mesh screen 76 may be formed from a fine wire having a fine wire diameter. The coarse wire diameter may be greater than the fine wire diameter. As examples, the coarse wire diameter may be at least 2, at least 3, at least 4, at least 5, at least 6, at least 8, and/or at least 10 times larger than the fine wire diameter.

The screen members may be of the same or different construction, and more or less screen members may be used. For example, in some embodiments, the coarse mesh screen 74 is not utilized and the screen structure may comprise only two fine mesh screens, as discussed.

Generally, support structure 64 may include any suitable supporting medium that enables permeated gas to flow in the harvesting conduit generally parallel and transverse to the membranes. For example, porous ceramics, porous carbon, porous metal, ceramic foam, carbon foam, and/or metal foam may be used to form the screen structure 70, either alone, or in combination with one or more screen members 73. As an example, fine mesh screens 76 may be formed from expanded metal instead of a woven mesh material.

Screen structure 70 may be formed from a corrosion-resistant material that will not impair the operation of the membrane module and devices with which the membrane module is used. Examples of suitable materials for screen members 73 include stainless steels, zirconium and alloys thereof, corrosion-resistant alloys, including Inconel™ alloys, such as 800™, and Hastelloy™ alloys, and alloys of copper and nickel, such as Monel™. Such metallic screen members optionally may include a coating on surface 71. The coating may include, or be, a metallic oxide or nitride. Examples of suitable coatings include aluminum oxide, tungsten carbide, tungsten nitride, titanium carbide, titanium nitride, chromium or titanium oxide, copper, silver or gold and mixtures thereof.

Returning to FIG. 5, membrane modules 44 further may include a corresponding feed plate assembly 100 positioned between each adjacent pair of membrane packs 66 in a stack of membrane packs. In addition, membrane modules 44 may include a plurality of end plates 140, including a first end plate 1401 on a first end of stack 65 and a second end plate 1402 on a second end of stack 65, and an enclosure 142. End plates 140 and enclosure 142 together may form and/or define an enclosed volume 146 that houses and/or contains stack 65.

Feed plate assemblies 100 may be configured to provide a mixed gas stream 36 to mixed gas region 484 and/or to receive a byproduct stream 40 from the mixed gas region. Mixed gas region 484 may be at least partially defined by the first mixed gas face of a first hydrogen-selective membrane of a first membrane pack in an adjacent pair of membrane packs and also by a second mixed gas face of a second hydrogen-selective membrane of a second membrane pack in the adjacent pair of membrane packs.

Feed plate assemblies 100 may include a feed plate 102, which may include and/or define supply channels 114 and/or exhaust channels 116. Feed plate 102 may be positioned between adjacent membrane packs 66. Additionally or alternatively, feed plate 100 may be positioned between stack 65 and an end plate 140. Feed plate assemblies 100 also may include a feed frame 118. Feed frame 118 may be formed around a periphery of feed plate 102 to form an open volume 119 between the feed plate and the end plate.

Open volume 119 may permit fluid communication between a corresponding supply channel 114 and a corresponding exhaust channel 116. However, open volume 119 may not have a corresponding hydrogen-selective membrane associated therewith. As such, flow of the mixed gas stream, through the open volume, between supply channels 114 and exhaust channels 116 may represent a waste of the mixed gas stream with no potential for recovery of hydrogen gas therefrom. Thus, and as further illustrated in dashed lines in FIG. 5, membrane modules 44 may include a blocker gasket 250. Blocker gasket 250, when present, may be positioned between the feed plate and the end plate and may be configured to block fluid flow between the supply channel and the exhaust channel. The blocker gasket may extend within a central portion of the open volume and/or around a periphery of the feed plate, as illustrated.

As illustrated in dashed lines in FIG. 5, membrane module 44 also may include a supply manifold 110 and/or an exhaust manifold 112. Supply manifold 110 may be configured to provide mixed gas stream 36 to mixed gas region 484, such as via supply channels 114. Exhaust manifold 112 may be configured to receive byproduct stream 40 from the mixed gas region, such as via exhaust channels 116.

As also illustrated in dashed lines in FIG. 5, membrane modules 44 may include a compliance gasket 96. Compliance gasket 96 may be positioned between at least one adjacent pair of membrane packs and/or may be positioned between stack 65 and one or more end plates 140. Compliance gasket 96, when present, may be configured to be compressed upon assembly of membrane module 44, thereby decreasing a potential for over-compression of, or damage to, the membrane module.

With this in mind, compliance gasket 96 may have a thickness that is at least a threshold multiple of a thickness of permeate-side frame members 88 and/or of mixed gas-side frame members 89. Examples of the threshold multiple include threshold multiples of at least 2, at least 4, at least 6, at least 8, at least 10, at least 12, at least 14, at least 16, at least 18, and/or at least 20. Examples of the thickness of the compliance gasket include thicknesses of at least 0.25 millimeters (mm), at least 0.5 mm, at least 0.75 mm, at least 1 mm, at least 1.25 mm, at least 1.5 mm, at most 2.5 mm, at most 2.25 mm, at most 2 mm, at most 1.75 mm, and/or at most 1.5 mm.

FIGS. 7-14 provide more detailed and/or less schematic illustrations of membrane modules 44, of components of membrane modules 44, and/or of hydrogen purifiers 38, fuel processors 12, and/or fuel cell systems 10 that include and/or utilize membrane modules 44, according to the present disclosure. FIGS. 7-14 may be alternative illustrations of the fuel cell systems, fuel processors, hydrogen purifiers, and/or membrane modules discussed herein with reference to FIGS. 1-6, and any of the structures, functions, and/or features disclosed herein with reference to FIGS. 7-14 may be included in and/or utilized with FIGS. 1-6 without departing from the scope of the present disclosure. Similarly, any of the structures, functions, and/or features disclosed herein with reference to FIGS. 1-6 may be included in and/or utilized with FIGS. 7-14 without departing from the scope of the present disclosure.

As discussed, hydrogen-permeable, or hydrogen-selective, membranes 46 may be arranged in pairs around a common support structure, or permeate support structure, 64 to form a membrane pack 66, such as that as schematically illustrated in FIGS. 4-6. In such a configuration, the membrane pairs may be referred to as membrane pack 66 in that they define a common permeate channel, or harvesting conduit, 69 through which the permeated gas may be collected and removed to form hydrogen-rich stream 42 or product hydrogen stream 14, as illustrated in FIGS. 1-4.

The membrane pairs may take a variety of suitable shapes, such as planar packs and tubular packs. Similarly, the membranes may be independently supported, such as with respect to an end plate or around a central passage. For purposes of illustration, the following description and associated illustrations will describe the membrane module as including one or more membrane packs 66. The membranes forming the pack may be two separate membranes, or may be a single membrane folded, rolled or otherwise configured to define two membrane regions, or surfaces 67 with permeate faces 68 that are oriented toward each other to define a harvesting conduit 69 therebetween from which the permeate gas may be collected and withdrawn.

Figure 7:
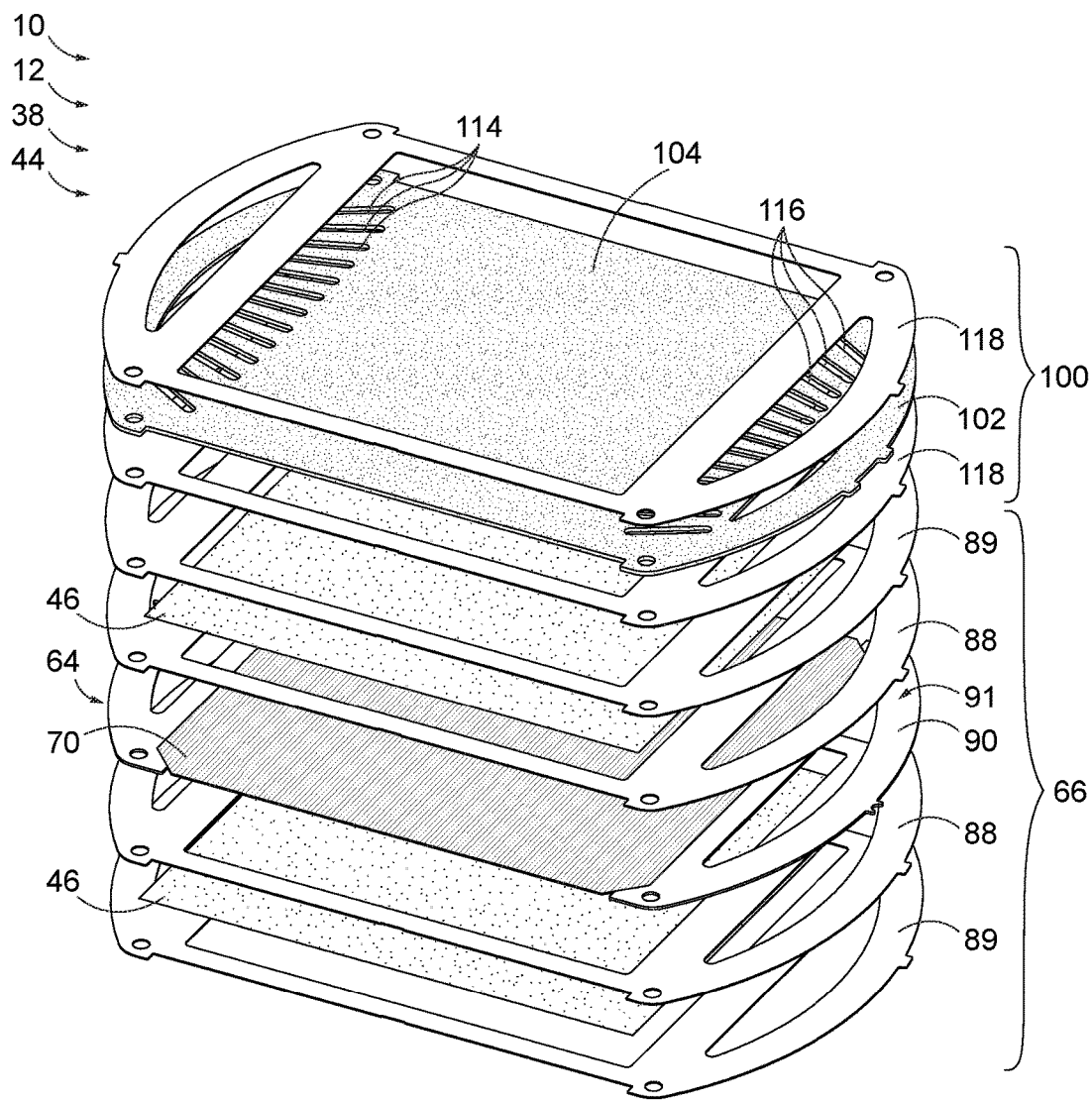
FIG. 7 is an exploded isometric view illustrating an example of a membrane pack used in a hydrogen purifier according to the present disclosure.

As discussed, support structure 64 and hydrogen-selective membranes 46 may be incorporated into a membrane pack 66 that further includes permeate-side frame members 88 and/or mixed gas-side frame members 89 that are configured to seal, support, and/or interconnect the membrane packs for use in fuel processing systems, gas purification systems, and the like. An example of such a membrane pack 66 and a corresponding feed plate assembly 100 is illustrated in FIG. 7. Support structure 64 of FIG. 7 includes a screen structure 70 that fits within a permeate frame 90 and/or extends at least partially over the surface of the permeate frame to form a permeate plate assembly 91. A permeate-side frame member 88 extends and/or is positioned on each planar side of permeate plate assembly 91 and may be utilized to seal the permeate plate assembly to another structure of membrane pack 66, as discussed in more detail herein.

A feed plate assembly 100 is positioned between adjacent membrane packs to deliver the hydrogen-rich reformate stream to the membrane pack for separating hydrogen from the reformate stream, and to remove the resulting hydrogen-depleted stream from the membrane pack. As shown in FIG. 7, feed plate assembly 100 comprises a center feed plate 102 that separates one membrane pack from another membrane pack in a stack. As further shown in FIG. 8, center feed plate 102 has a central region 104, as well as a supply region 106 and an exhaust region 108 on the periphery of center feed plate 102. Central region 104 may be fluid impermeable, or at least substantially fluid impermeable. Supply region 106 fluidly connects a supply manifold 110 to a mixed gas region 484 via one or more supply channels 114. Similarly, exhaust region 108 fluidly connects exhaust manifold 112 to mixed gas region 484 via one or more exhaust channels 116. Mixed gas region 484 also may be referred to herein as an open volume 484. Supply channels 114 and exhaust channels 116 are formed though a thickness, or an entirety of the thickness, of the feed plate. Stated another way, supply channels 114 and exhaust channels 116 provide fluid communication between supply manifold 110 and exhaust manifold 112, respectively, and both top and bottom sides, or faces, of center feed plate 102.

Figure 8:
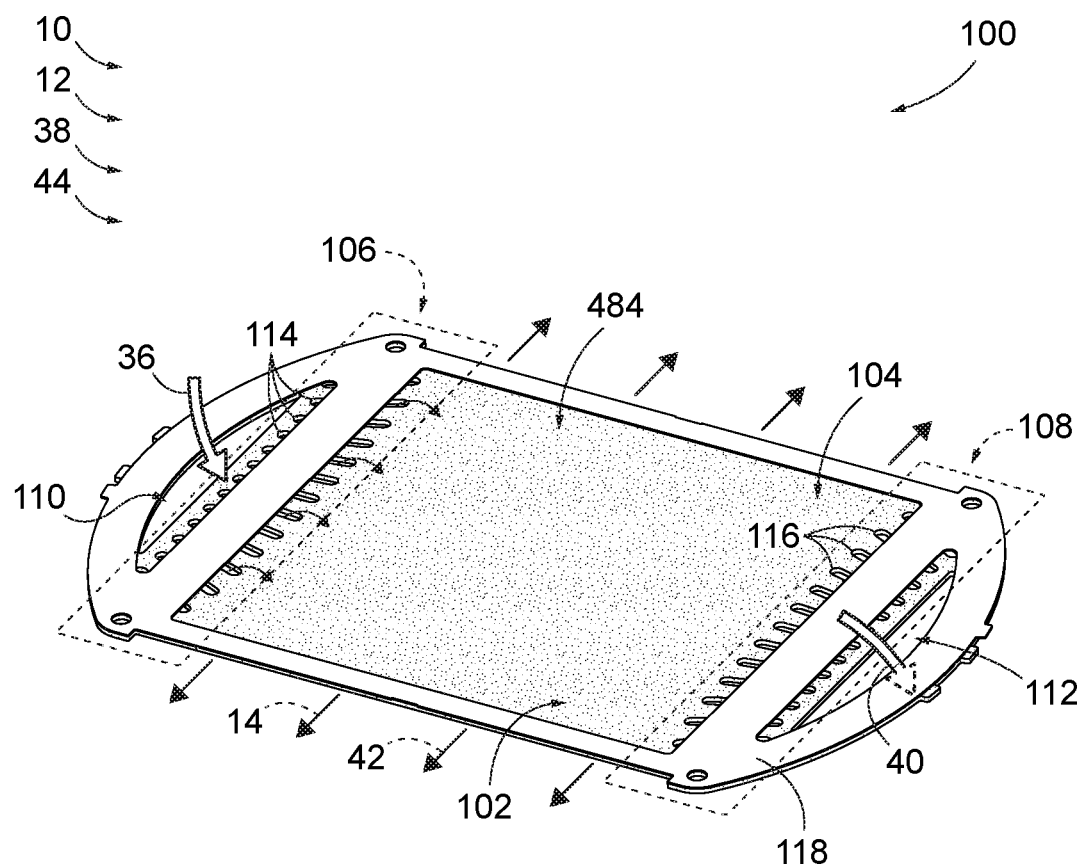
FIG. 8 is an isometric view illustrating an example of a membrane pack for a hydrogen purifier according to the present disclosure.

Center feed plate 102 of FIG. 8 does not include flow channels or the like in its central region 104. Stated another way, central region 104 may be solid and/or fluid impermeable. Instead, a feed frame 118 overlaps the periphery of each side of the feed plate to create an open volume between central region 104 and its adjacent membrane pack, the open volume being formed by the thickness of feed frame 118 and of the mixed gas-side frame member 89 of the neighboring membrane pack, as illustrated in FIG. 7. As illustrated in FIG. 8, in some hydrogen purifiers, feed frame 118 overlaps a central portion of channels 114, 116 (i.e., does not overlap channels 114, 116 at their ends). Thus, reformate stream 36 provided from supply manifold 110 flows through channels 114 in the supply region (and underneath feed frame 118), and then into open volume 484 formed by the thickness of feed frame 118 and/or mixed gas-side frame member 89. Similarly, byproduct stream 40 flows from the open volume through channels 116 in the exhaust region (and underneath feed frame 118), and then to exhaust manifold 112. Therefore, the width of feed frame 118 in the area that overlaps a central portion of channels 114, 116 of center feed plate 102 is necessarily smaller than the span, or length, of channels 114, 116 so that supply and exhaust manifolds 110, 112 are fluidly connected to the open volume.

Figure 9:
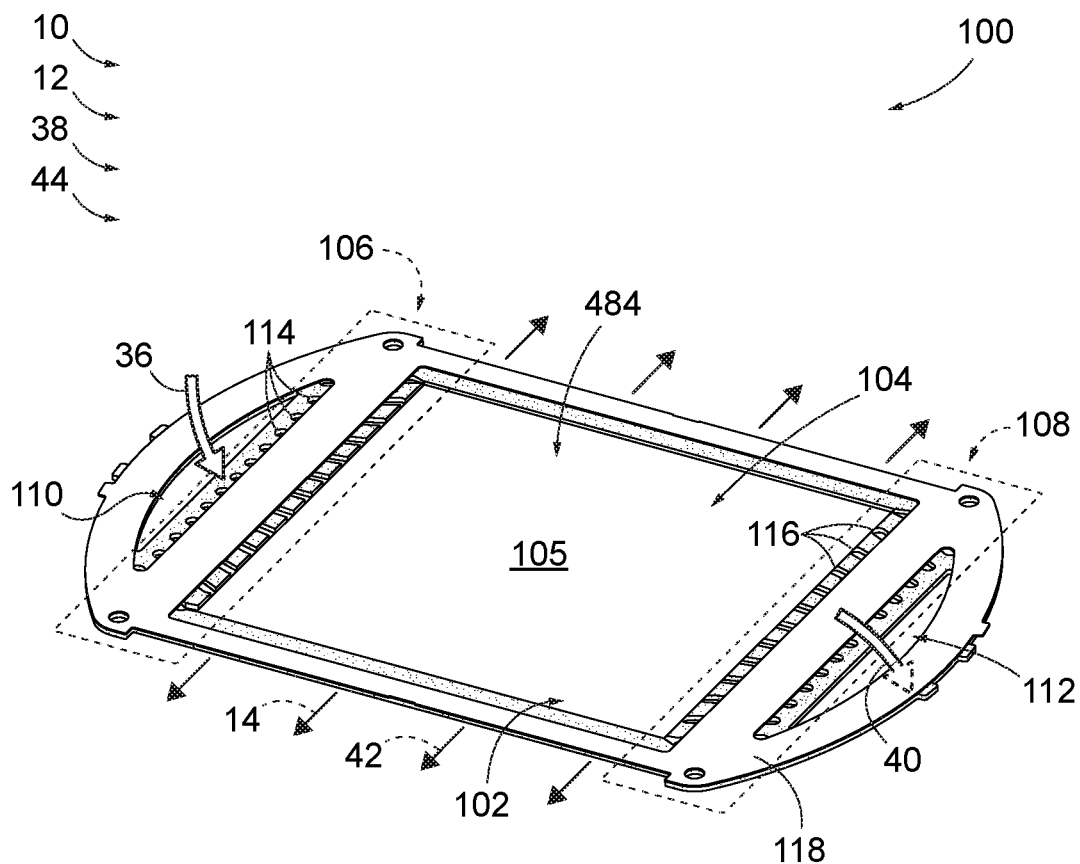
FIG. 9 is an isometric view illustrating another example of a membrane pack for a hydrogen purifier according to the present disclosure.

However, and as illustrated in FIG. 9, center feed plates 102 that include an open central region 104 also are within the scope of the present disclosure. In such a center feed plate, supply channels 114 and exhaust channels 116 may extend either partially or completely through the thickness of the center feed plate and into fluid communication with an opening 105 that is defined within central region 104 and/or that at least partially defines open volume 484. FIGS. 7, 10, and 12-14 illustrate membrane modules 44 including center feed plates 102 that include a fluid impermeable central region 104; however, it is within the scope of the present disclosure that center feed plate 102 of FIG. 9 may be included in and/or utilized with membrane modules 44 of FIGS. 7, 10, and 12-14.

For parallel flow designs of membrane modules, the total mass flow of the reformate stream is divided between the membrane packs, which results in low gas velocities to each of the membrane pack and low pressure drops, typically less than 5 psi, between the supply and exhaust manifolds. As a result, the flow velocity of the reformate stream may be in the laminar flow region, in which case the hydrogen concentration at the surface of the membrane is governed by diffusion. However, this is not required to all flows of the reformate stream, and it is within the scope of the present disclosure that the flow velocity of the reformate stream may be in the turbulent flow regime. For thin membranes, the hydrogen flux through the membrane is relatively high and, thus, it is desirable to have a high hydrogen concentration at the surface of the membrane (i.e., low hydrogen concentration gradient in the direction perpendicular to the membrane surface) so that hydrogen flux through the membrane is maximized, which increases efficiency of the hydrogen separation device.

Figure 10:
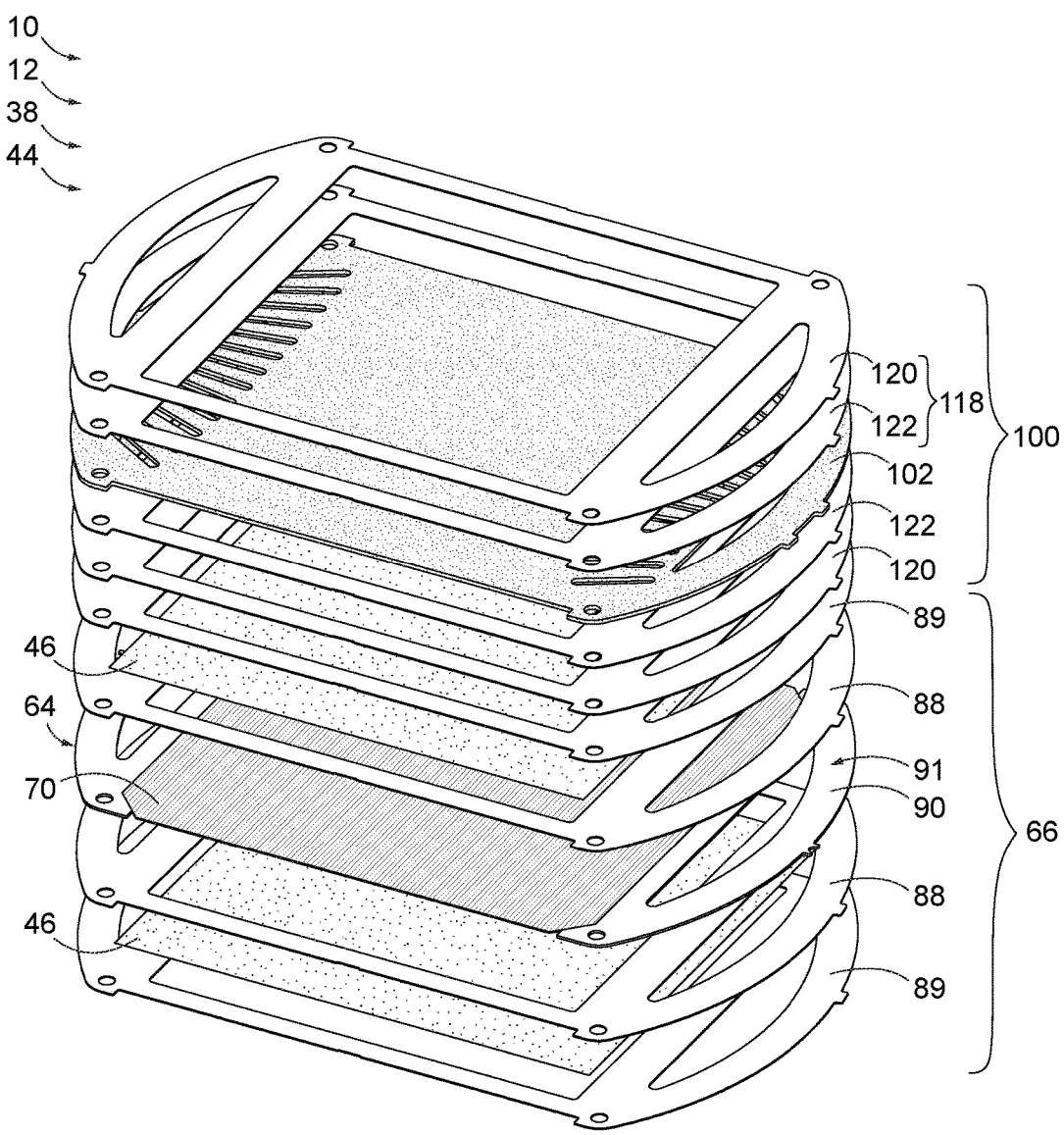
FIG. 10 is an exploded isometric view illustrating another example of a membrane pack used in a hydrogen purifier according to the present disclosure.

In some hydrogen purifiers, feed frame 118 may comprise of two or more separate parts. For example, and as illustrated in FIG. 10, feed frame 118 may comprise an outer feed plate 120 and a feed plate gasket 122 interposed between outer feed plate 120 and center feed plate 102. The thickness of outer feed plate 120 and feed plate gasket 122 forms open volume 484 above the membrane. One skilled in the art will be able to select a suitable thickness of the plate and gasket based on the desired effective height of the gas volume in the active area and the functional limitations of each part. Again, outer feed plate 120 and feed plate gasket 122 overlap a central portion of channels 114, 116 so that inlet and outlet manifolds 110, 112 are fluidly connected to the open volume.

In the membrane packs described above, hydrogen-selective membranes of various thicknesses may be utilized. The present disclosure permits using thin membranes in the membrane modules configured to be used as hydrogen purifiers described above with the advantage of reducing the overall cost. The inventors have discovered a number of ways to protect the thin Pd—Cu membranes from irreversible, mechanical damage, as further described below, thus permitting membrane modules, according to the present disclosure, to utilize thinner hydrogen-selective membranes when compared to conventional membrane modules.

Figure 11:
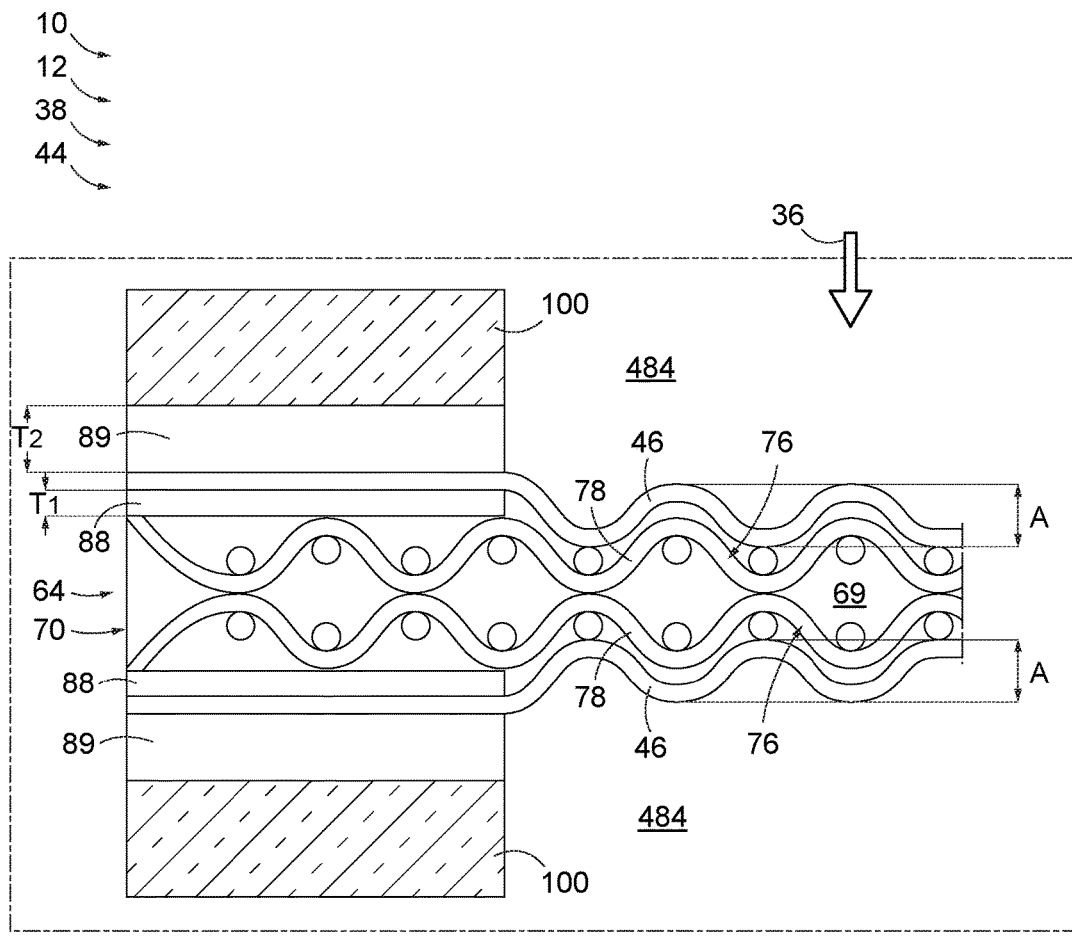
FIG. 11 is a fragmentary cross-sectional view through a schematic membrane pack that includes thin hydrogen-selective membranes according to the present disclosure.

As illustrated in FIG. 5 and in more detail in FIG. 11, membrane modules 44, according to the present disclosure, may utilize a permeate-side frame member 88 and a mixed gas-side frame member 89 of differing thicknesses. More specifically, and as illustrated in FIG. 11, a thickness, $T_1$, of the permeate-side frame member may be less than a thickness, $T_2$, of the corresponding mixed gas-side frame member 89. Stated another way, a thickness $T_1$ of frame member 88 on the low-pressure side of a given membrane 46, which is located next to and/or seals against support structure 64, is different from the thickness of the frame member 89 on the high-pressure side of the membrane, which is located next to the feed plate assembly 100. The edge of membrane 46 is located between frame members 88 and 89, and the rest of the membrane is supported by fine mesh screen 76. A thinner frame member 88 may provide a smoother transition of the membrane from the frame member support to the mesh screen support, may put less mechanical strain on the membrane, and/or may increase a longevity of the membrane. As discussed, frame member 88 preferably is made of a material having a higher density than the material of frame member 89, which makes it easier to handle and reduces the risk of mechanical damage during assembly.

During production, hydrogen-selective membranes 46, such as those utilized in membrane modules 44 that are disclosed herein, are subjected to a thickness reduction process through rolling to achieve a desired membrane thickness. During this process, a hardness of the hydrogen-selective membrane is increased as the membrane is reduced in thickness by rolling. Therefore, membranes generally are subjected to an annealing heat treatment to soften them before the thickness reduction process takes place. In the present embodiment, the hardness of the membrane can be limited by limiting the amount of membrane thickness reduction so that the membrane installed in the hydrogen purifier has a thickness of about 70% to about 95% of the membrane thickness after its final annealing process. This may permit utilization of thinner membranes that otherwise would be too brittle and/or would be susceptible to failure, especially in the region where the membrane is supported by the support structure.

Fine mesh screens 76 may be selected to reduce the risk of mechanical damage to the membrane, and examples of the fine mesh screens are disclosed herein. As illustrated in FIG. 11, membrane 46 is not flat when supported by the frame members and by the fine mesh screen. Instead, the hydrogen-selective membrane has an undulation as it conforms to the shape of the fine mesh screen. The maximum allowed value for an amplitude, A, of the membrane undulation that decreases a potential for mechanical damage to the membrane may be determined through tests and/or through modelling techniques such as FEA. Accordingly, the dimensions of the wires, which form the fine mesh screens, may be selected to be within a predetermined range such that the maximum amplitude of the membrane undulation stays within the allowed range.

The fine mesh screens 76 used in hydrogen purifiers may be of any suitable woven style or pattern. As examples, fine mesh screens 76 may utilize or be of a plain weave, a Dutch weave, and/or a Dutch twill weave. According to the present disclosure, the fine mesh screens may be selected such to maintain the amplitude, A, of membrane undulation below a maximum desired amplitude of undulation. Examples of the maximum desired amplitude, A, of undulation for thin hydrogen-selective membranes 46 utilized herein include maximum desired amplitudes, A, of undulation of at most 100 micrometers, at most 90 micrometers, at most 80 micrometers, at most 70 micrometers, at most 60 micrometers, at most 50 micrometers, at most 45 micrometers, at most 40 micrometers, at most 35 micrometers, at most 30 micrometers, and/or at most 25 micrometers.

With this in mind, and when fine mesh screen 76 includes a Dutch or Dutch twill weave, a diameter of a shute wire 78 of the Dutch weave or Dutch twill weave may be selected to be at least 1.5, at least 1.6, at least 1.7, at least 1.8, at least 1.9, and/or at least 2 times the maximum desired amplitude of the undulation within the hydrogen-selective membrane. Additionally or alternatively, the diameter of the shute wire of the Dutch weave or Dutch twill weave may be selected to be at most 2.5, at most 2.4, at most 2.3, at most 2.2, at most 2.1, or at most 2 times the maximum desired amplitude of undulation within the hydrogen-selective membrane.

Additionally or alternatively, and when the fine mesh screen includes a plain weave, the diameter of the shute wire of the plain weave may be selected to be at least 0.6, at least 0.7, at least 0.8, at least 0.9, at most 0.9, at most 1.0, at most 1.1, at most 1.2, at most 1.4, and/or at most 1.5 times the maximum desired amplitude of the undulation within the first hydrogen-selective membrane and also within the second hydrogen-selective membrane. Examples of the diameter of the shute wire for the shute wire of the plain weave fine mesh screen that may provide less than the maximum desired amplitude, A, of undulation within the hydrogen-selective membrane include diameters of at least 0.01 mm, at least 0.015 mm, at least 0.02 mm, at least 0.025 mm, at least 0.03 mm, at least 0.035 mm, at least 0.04 mm, at least 0.045 mm, at most 0.06 mm, at most 0.055 mm, at most 0.05 mm, at most 0.045 mm, at most 0.04 mm, at most 0.035 mm, and/or at most 0.03 mm. Examples of a mesh count of the plain weave fine mesh screen that may provide less than the maximum desired amplitude, A, of undulation within the hydrogen-selective membrane include mesh counts of at least 150, at least 175, at least 200, at least 225, at least 250, at least 275, at least 300, at least 325, at least 350, at least 375, and/or at least 400 shute wires per inch. For plain weave, the diameter of the warp wires is generally equal to the diameter of the shute wires.

Figure 12:
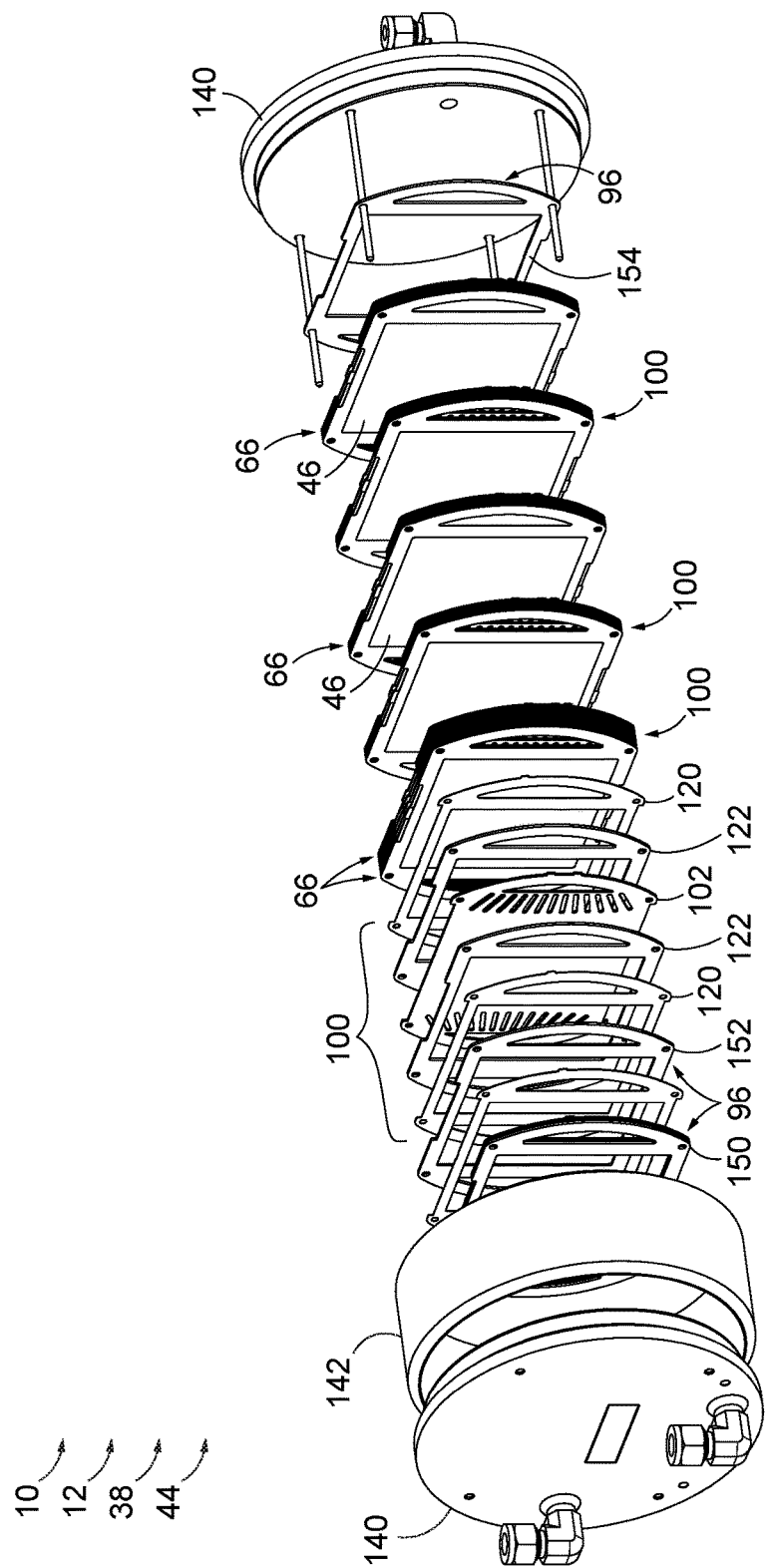
FIG. 12 is an exploded isometric view of a hydrogen purifier, according to the present disclosure, including thin hydrogen-selective membranes and compliance gaskets.

An exploded view of an embodiment of a membrane module 44, according to the present disclosure, that is configured to be used in or as a hydrogen purifier 38 is illustrated in FIG. 12. The membrane module comprises several membrane packs 66, a center feed plate 102 between outer feed plates 120 and feed plate gaskets 122, which are stacked between two end plates 140 and are enclosed in the cylindrical enclosure 142 when assembled together. This embodiment comprises several compliance gaskets 96, which are indicated at 150, 152, 154, and which, in this example, are placed at both ends of a membrane stack 65. The compliance gaskets may be placed between the membrane packs anywhere along the length of the stack.

These compliance gaskets may compensate for the variance in tolerance of the dimensions of the metal components of the membrane packs or for the variance in dimensions due to the assembly of the membrane packs, for example, through welding or other assembling methods (e.g., bolting). The compliance gaskets allow a larger range of displacement during the assembly process while maintaining the load applied to the membrane packs within acceptable limits. Several thinner gaskets can be used, for example gaskets 150 and 152 or one thicker gasket, for example, gasket 154. The overall thickness of the compliance gasket matters and the desired overall thickness can be achieved by either one thick gasket or several thinner gaskets. The overall thickness of the compliance gasket(s) is based on the estimated shrinkage of the stack during assembly and depends on the assembly method being used. For example, in a bolted assembly the thickness of the compliance gasket (s) may be smaller than in a welded assembly. In some embodiments, three compliance gaskets with a thickness of about 1.5 mm each have been used in a welded assembly to prevent mechanical damage to hydrogen-selective membranes 46 during assembly of the membrane module.

Figure 13:
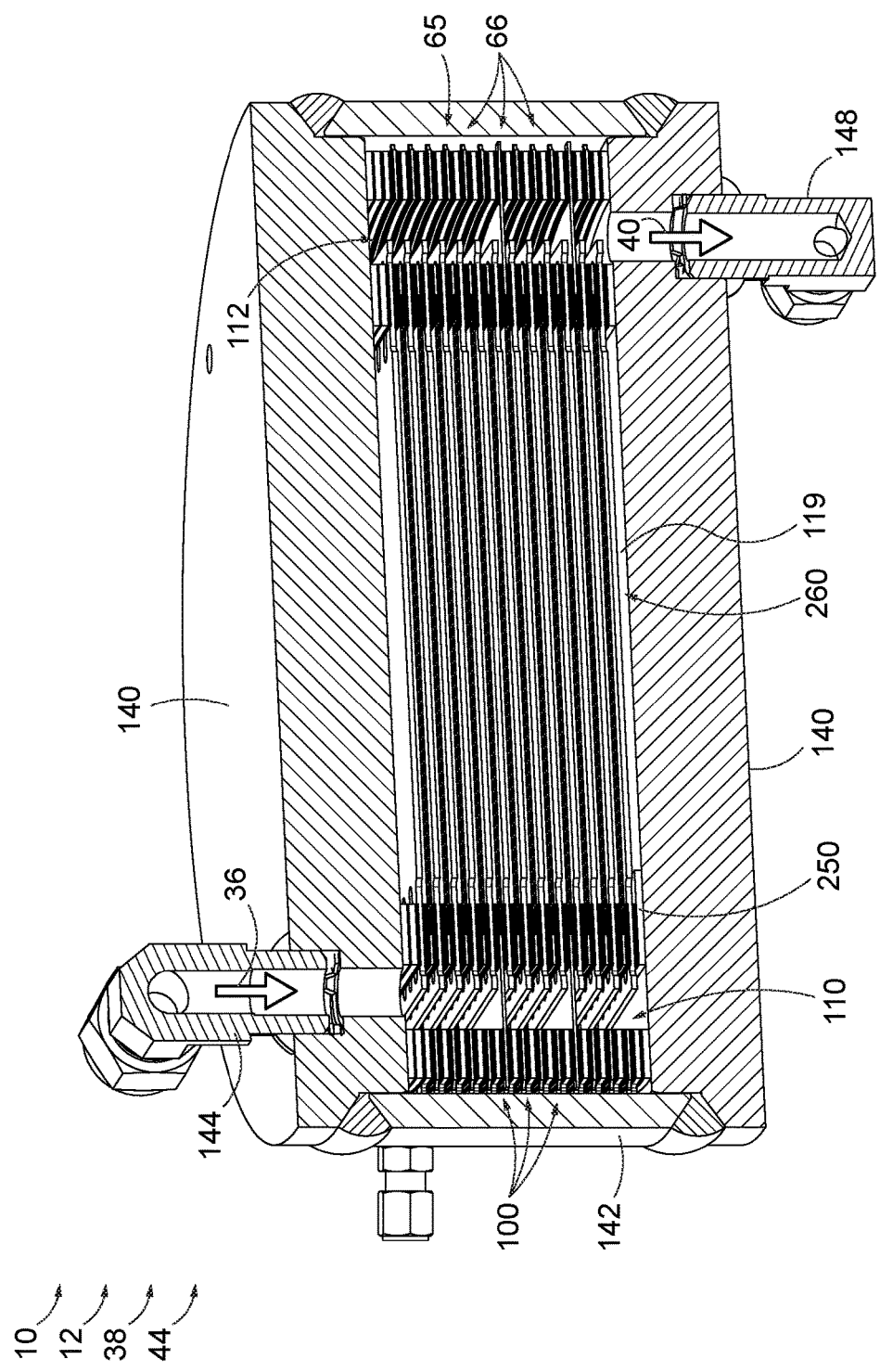
FIG. 13 is a cross-sectional view of a hydrogen purifier, according to the present disclosure, having thin membranes and a blocker gasket.
Figure 14:
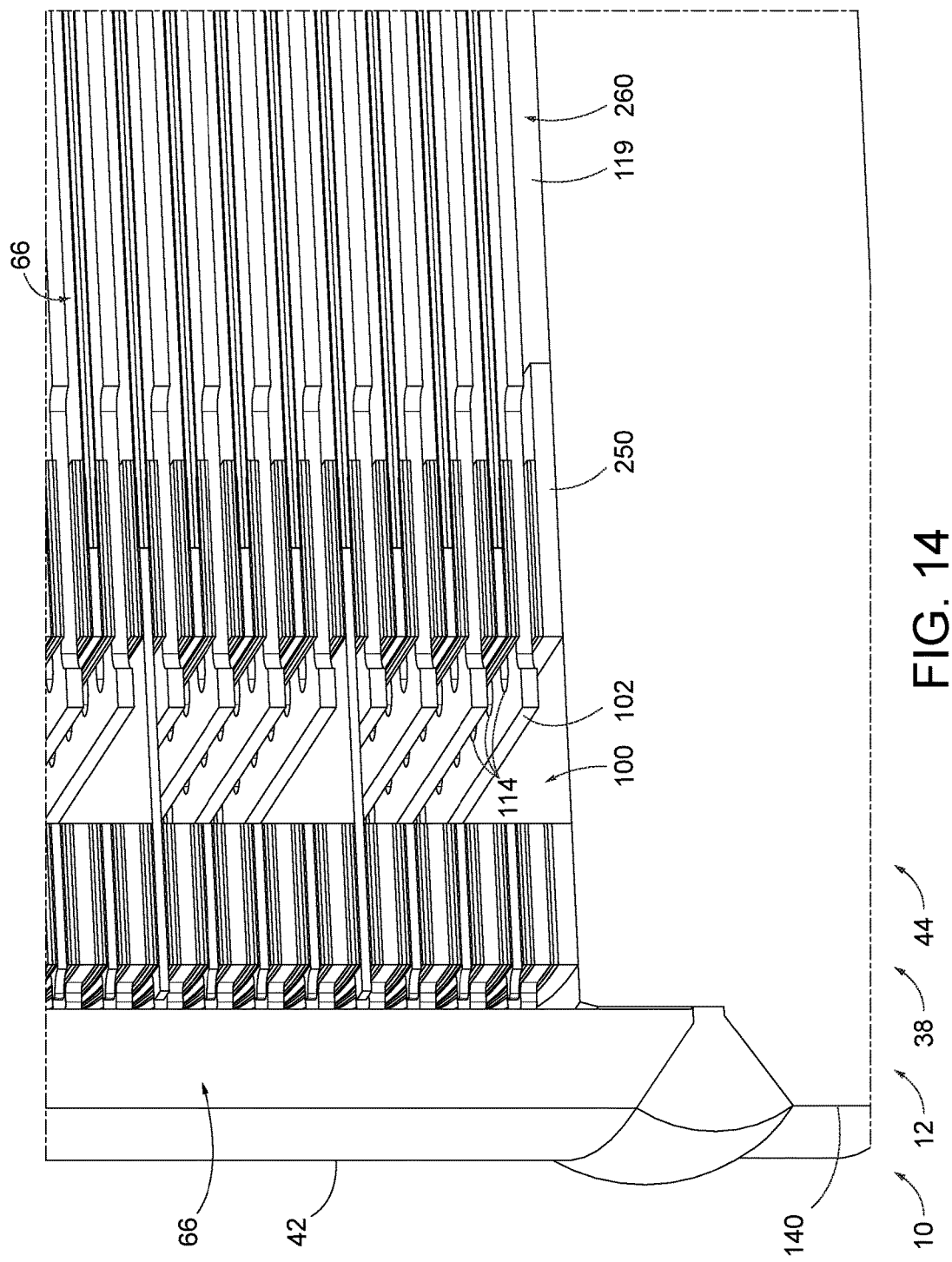
FIG. 14 shows a detail of the cross-sectional view of FIG. 13.

FIG. 13 illustrates a cross-section through a membrane module 44, according to the present disclosure, that is configured to be used as a hydrogen purifier, while FIG. 14 illustrates a more detailed view of a portion of the membrane module of FIG. 13. Membrane module 44 comprises two end plates 140 and a cylindrical casing 142, which enclose a stack 65 of components consisting of membrane packs 66, feed plates 102, and various frame members and/or gaskets. Membrane module 44 may be similar to the membrane module illustrated in the exploded view of FIG. 10.

Reformate gas 36 is supplied through a supply pipe 144 to a supply manifold 110 of the membrane module. From supply manifold 110, the reformate gas is divided between membrane packs 66 and flows through the respective supply channels of the membrane packs, as illustrated in FIG. 8, and across the membrane packs toward an exhaust manifold 112. A byproduct stream may flow out of the membrane module through an exhaust pipe 148.

As illustrated in FIGS. 13-14, a blocker gasket 250 may be positioned between a last plate assembly in the stack and the end plate. Blocker gasket 250, when present, covers the exit of supply channels 114 in a feed plate 102 that is in contact therewith. Thus, blocker gasket 250 blocks, restricts, and/or does not permit fluid flow from supply manifold 110 into an open volume 119 that is defined by a last channel 260 of membrane module 44. Absent blocker gasket 250, a portion of the reformate gas supplied from the supply manifold into open volume 119 would be directed to exhaust pipe 148, as illustrated in FIG. 13. However, the presence of blocker gasket 250 prevents this flow of the reformate stream through open volume 119, thereby increasing an overall efficiency of membrane modules 44 that include blocker gaskets 250. Tests have shown that the presence of blocker gasket 250 results in an overall hydrogen recovery improvement of at least 1 to 2%.

It should be understood that the geometry of the frame members, gaskets, membranes and screen members shown in the figures are provided as illustrative examples, and it should be understood that these components may be of any suitable shape. Similarly, the configuration and orientation of the passages through the gaskets and plates may vary, depending upon the particular application with which the membrane module will be used.

It should also be understood that the hydrogen purity of the product stream, the hydrogen content of the byproduct stream, the percentage of hydrogen from the mixed gas stream that forms the byproduct stream, and similar compositions of the product and byproduct streams may be selectively varied depending upon the construction of the membrane module and/or the operating conditions within which the membrane module is used. For example, the compositions of the product and byproduct streams may vary at least partially in response to at least the following factors: the temperature of the membrane module, the pressure difference between the feed gas and the permeate gas in the membrane module, the composition of the hydrogen-selective membrane, degradation of the hydrogen-selective membrane, the thickness of the hydrogen-selective membrane, the composition of the mixed gas stream, the number of hydrogen-selective membranes used in the membrane module, and the number and the flow configuration of the sequential membranes through which the mixed gas, product and/or byproduct streams may pass.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of membrane modules, hydrogen purifiers, fuel processors, and fuel cell systems, according to the present disclosure, are presented in the following enumerated paragraphs.

A1. A membrane module for hydrogen separation, the membrane module comprising:
  a plurality of membrane packs, optionally including a stack of membrane packs, disposed adjacent one another, wherein each membrane pack comprises:
    (i) a first hydrogen-selective membrane defining a first permeate face and an opposed first mixed gas face;
    (ii) a second hydrogen-selective membrane defining a second permeate face and an opposed second mixed gas face; and
    (iii) a fluid-permeable support structure positioned between the first hydrogen-selective membrane and the second hydrogen-selective membrane such that the support structure physically contacts, and supports, at least a central region of the first permeate face and at least a central region of the second permeate face and also such that the central region of the first permeate face is spaced-apart from the central region of the second permeate face.

A2. The membrane module of paragraph A1, wherein each membrane pack further includes:
  (i) a first permeate-side frame member interposed between the first hydrogen-selective membrane and the support structure such that the first permeate-side frame member physically contacts, and supports, a peripheral region of the first permeate face and a peripheral region of the support structure;
  (ii) a second permeate-side frame member interposed between the second hydrogen-selective membrane and the support structure such that the second permeate-side frame member physically contacts, and supports, a peripheral region of the second permeate face and the peripheral region of the support structure;
  (iii) a first mixed gas-side frame member positioned to physically contact, and support, a peripheral region of the first mixed gas face; and
  (iv) a second mixed gas-side frame member positioned to physically contact, and support, a peripheral region of the second mixed gas face.

A3. The membrane module of any of paragraphs A1-A2, wherein:
  (i) the first permeate-side frame member is configured to form a fluid seal between the peripheral region of the first permeate face and the peripheral region of the support structure; and
  (ii) the second permeate-side frame member is configured to form a fluid seal between the peripheral region of the second permeate face and the peripheral region of the support structure.

A4. The membrane module of any of paragraphs A1-A3, wherein at least one of:
  (i) a thickness of the first permeate-side frame member is less than a thickness of the first mixed gas-side frame member; and
  (ii) a thickness of the second permeate-side frame member is less than a thickness of the second mixed gas-side frame member.

A5. The membrane module of paragraph A4, wherein at least one of:
  (i) the thickness of the first permeate-side frame member is less than 95%, less than 90%, less than 85%, less than 80%, less than 75%, less than 70%, less than 65%, less than 60%, less than 55%, less than 52%, less than 50%, or less than 45% of the thickness of the first mixed gas-side frame member; and
  (ii) the thickness of the second permeate-side frame member is less than 95%, less than 90%, less than 85%, less than 80%, less than 75%, less than 70%, less than 65%, less than 60%, less than 55%, less than 52%, less than 50%, or less than 45% of the thickness of the second mixed gas-side frame member.

A6. The membrane module of any of paragraphs A4-A5, wherein at least one of the thickness of the first permeate-side frame member and the thickness of the second permeate-side frame member is at least one of:
  (i) at least 0.05 millimeters (mm), at least 0.075 mm, at least 0.1 mm, or at least 0.125 mm; and (ii) at most 0.25 mm, at most 0.20 mm, at most 0.175 mm, at most 0.15 mm, or at most 0.125 mm.

A7. The membrane module of any of paragraphs A4-A6, wherein at least one of the thickness of the first mixed gas-side frame member and the thickness of the second mixed gas-side frame member is at least one of:
  (i) at least 0.15 millimeters (mm), at least 0.2 mm, at least 0.25 mm, or at least 0.3 mm; and
  (ii) at most 0.6 mm, at most 0.5 mm, at most 0.45 mm, at most 0.4 mm, or at most 0.35 mm.

A8. The membrane module of any of paragraphs A2-A7, wherein at least one of:
  (i) the first permeate-side frame member has a first permeate-side frame member density, and further wherein the first mixed gas-side frame member has a first mixed gas-side frame member density that is less than a threshold fraction of the first permeate-side frame member density; and
  (ii) the second permeate-side frame member has a second permeate-side frame member density, and further wherein the second mixed gas-side frame member has a second mixed gas-side frame member density that is less than a threshold fraction of the first permeate-side frame member density.

A9. The membrane module of paragraph A8, wherein the threshold fraction is 95%, 90%, 85%, 80%, 78%, 75%, 70%, or 65%.

A10. The membrane module of any of paragraphs A8-A9, wherein at least one of the first permeate-side frame member density and the second permeate-side frame member density is at least one of:
  (i) at least 1 gram per cubic centimeter (g/cc), at least 1.1 g/cc, at least 1.2 g/cc, at least 1.3 g/cc, at least 1.4 g/cc, or at least 1.5 g/cc; and
  (ii) at most 1.8 g/cc, at most 1.7 g/cc, at most 1.6 g/cc, at most 1.5 g/cc, or at most 1.4 g/cc.

A11. The membrane module of any of paragraphs A8-A10, wherein at least one of the first mixed gas-side frame member density and the second mixed gas-side frame member density is at least one of:
  (i) at least 0.7 gram per cubic centimeter (g/cc), at least 0.8 g/cc, at least 0.9 g/cc, at least 1 g/cc, at least 1.1 g/cc, or at least 1.2 g/cc; and
  (ii) at most 1.4 g/cc, at most 1.3 g/cc, at most 1.2 g/cc, at most 1.1 g/cc, or at most 1 g/cc.

A12. The membrane module of any of paragraphs A1-A11, wherein at least one of the first permeate-side frame member, the second permeate-side frame member, the first mixed gas-side frame member, and the second mixed gas-side frame member includes at least one of a gasket and a graphite gasket.

A13. The membrane module of any of paragraphs A1-A12, wherein the support structure includes a screen structure.

A14. The membrane module of paragraph A13, wherein the screen structure includes two fine mesh screens.

A15. The membrane module of paragraph A14, wherein the two fine mesh screens include at least one plain weave fine mesh screen.

A16. The membrane module of paragraph A15, wherein a diameter of a shute wire of the plain weave fine mesh screen is selected to provide less than a maximum desired amplitude of undulation within the first hydrogen-selective membrane and also within the second hydrogen-selective membrane.

A17. The membrane module of any of paragraphs A14-A15, wherein a/the diameter of a/the shute wire of the plain weave fine mesh screen is at most 0.9, at most 1.0, at most 1.1, at most 1.2, at most 1.4, or at most 1.5 times a/the maximum desired amplitude of the undulation within the first hydrogen-selective membrane and also within the second hydrogen-selective membrane.

A18. The membrane module of any of paragraphs A16-A17, wherein the maximum desired amplitude of undulation is at most 100 micrometers, at most 90 micrometers, at most 80 micrometers, at most 70 micrometers, at most 60 micrometers, at most 50 micrometers, at most 45 micrometers, at most 40 micrometers, at most 35 micrometers, at most 30 micrometers, or at most 25 micrometers.

A19. The membrane module of any of paragraphs A14-A18, wherein a/the diameter of a/the shute wire of the plain weave fine mesh screen is at least 0.01 mm, at least 0.015 mm, at least 0.02 mm, at least 0.025 mm, at least 0.03 mm, at least 0.035 mm, at least 0.04 mm, at least 0.045 mm, at most 0.06 mm, at most 0.055 mm, at most 0.05 mm, at most 0.045 mm, at most 0.04 mm, at most 0.035 mm, and/or at most 0.03 mm.

A20. The membrane module of any of paragraphs A14-A18, wherein the plain weave fine mesh screen includes at least 150, at least 175, at least 200, at least 225, at least 250, at least 275, at least 300, at least 325, at least 350, at least 375, or at least 400 shute wires per inch.

A21. The membrane module of any of paragraphs A14-A20, wherein the two fine mesh screens include at least one Dutch weave fine mesh screen, optionally wherein the at least one Dutch weave fine mesh screen includes at least one Dutch twill weave fine mesh screen.

A22. The membrane module of paragraph A21, wherein a diameter of a shute wire of the Dutch weave fine mesh screen is selected to provide less than a maximum desired amplitude of undulation within the first hydrogen-selective membrane and also within the second hydrogen-selective membrane.

A23. The membrane module of any of paragraphs A21-A22, wherein a/the diameter of a/the shute wire of the Dutch weave fine mesh screen is at least one of:
  (i) at least 1.5, at least 1.6, at least 1.7, at least 1.8, at least 1.9, or at least 2 times a maximum desired amplitude of the undulation within the first hydrogen-selective membrane and also within the second hydrogen-selective membrane; and
  (ii) at most 2.5, at most 2.4, at most 2.3, at most 2.2, at most 2.1, or at most 2 times the maximum desired amplitude of undulation within the first hydrogen-selective membrane and also within the second hydrogen-selective membrane.

A24. The membrane module of any of paragraphs A22-A23, wherein the maximum desired amplitude of undulation is at most 100 micrometers, at most 90 micrometers, at most 80 micrometers, at most 70 micrometers, at most 60 micrometers, at most 50 micrometers, at most 45 micrometers, at most 40 micrometers, at most 35 micrometers, at most 30 micrometers, or at most 25 micrometers.

A25. The membrane module of any of paragraphs A14-A24, wherein the screen structure further includes a coarse planar mesh screen positioned between the two fine mesh screens.

A26. The membrane module of paragraph A25, wherein the coarse planar mesh screen is formed from a coarse wire having a coarse wire diameter, wherein the two fine mesh screens are formed from a fine wire having a fine wire diameter, and further wherein the coarse wire diameter is at least 2, at least 3, at least 4, at least 5, at least 6, at least 8, or at least 10 times larger than the fine wire diameter.

A27. The membrane module of any of paragraphs A1-A26, wherein the plurality of membrane packs includes the stack of membrane packs, and further wherein the membrane module includes:
  (i) a corresponding feed plate assembly positioned between each adjacent pair of membrane packs in the stack of membrane packs;
  (ii) a first end plate on a first end of the stack of membrane packs; and
  (iii) a second end plate on a second end of the stack of membrane packs.

A28. The membrane module of paragraph A27, wherein the corresponding feed plate assembly is configured to:
  (i) provide a mixed gas stream to a corresponding mixed gas region that is at least partially defined by the first mixed gas face of the first hydrogen-selective membrane of a first membrane pack of each adjacent pair of membrane packs and also by the second mixed gas face of the second hydrogen-selective membrane of a second membrane pack of each adjacent pair of membrane packs; and
  (iii) receive a byproduct stream from the mixed gas region.

A29. The membrane module of any of paragraphs A27-A28, wherein the membrane module further includes a compliance gasket that is at least one of:
  (i) positioned between at least one adjacent pair of membrane packs; and
  (ii) positioned between the stack of membrane packs and at least one of the first end plate and the second end plate.

A30. The membrane module of paragraph A29, wherein a thickness of the compliance gasket is at least a threshold multiple of a/the thickness of a/the first permeate-side frame member, a/the second permeate-side frame member, a/the first mixed gas-side frame member, and a/the second mixed gas-side frame member, wherein the threshold multiple is at least 2, at least 4, at least 6, at least 8, at least 10, at least 12, at least 14, at least 16, at least 18, or at least 20.

A31. The membrane module of any of paragraphs A29-A30, wherein the compliance gasket is configured to be compressed, upon assembly of the membrane module, to decrease a potential for over-compression of the membrane module.

A32. The membrane module of any of paragraphs A29-A31, wherein a/the thickness of the compliance gasket is at least 0.25 millimeters (mm), at least 0.5 mm, at least 0.75 mm, at least 1 mm, at least 1.25 mm, at least 1.5 mm, at most 2.5 mm, at most 2.25 mm, at most 2 mm, at most 1.75 mm, and/or at most 1.5 mm.

A33. The membrane module of any of paragraphs A27-A32, wherein the membrane module further includes:
  (i) a supply manifold for supplying a/the mixed gas stream to a/the corresponding mixed gas region defined between adjacent membrane packs; and
  (ii) an exhaust manifold for removing a/the byproduct stream from the corresponding mixed gas region.

A34. The membrane module of paragraph A33, wherein the corresponding feed plate assembly includes:
  (i) a feed plate including at least one supply channel and at least one exhaust channel, wherein the feed plate is positioned between the stack of membrane packs and a selected end plate of the first end plate and the second end plate; and
  (ii) a feed frame positioned between the feed plate and the selected end plate, the feed frame being formed around a periphery of the feed plate and forming an open volume between the feed plate and the selected end plate.

A35. The membrane module of paragraph A34, wherein the membrane module further includes a blocker gasket positioned between the feed plate and the selected end plate, the blocker gasket being configured to block fluid flow between the at least one supply channel and the at least one exhaust channel via the open volume, optionally wherein the blocker gasket is formed around a periphery of the feed plate.

A36. The membrane module of any of paragraphs A1-A35, wherein a first thickness of the first hydrogen-selective membrane and a second thickness of the second hydrogen-selective membrane is at least one of at most 25 microns, at most 20 microns, at most 15 microns, at most 10 microns, at most 5 microns, at least 1 micron, at least 2 microns, at least 4 microns, at least 6 microns, at least 8 microns, at least 10 microns, and at least 12 microns.

A37. The membrane module of any of paragraphs A1-A36, wherein at least one of the first hydrogen-selective membrane and the second hydrogen-selective membrane is formed from at least one of a metal, a noble metal, a metal alloy, a binary alloy, a ternary alloy, palladium, a palladium alloy, a palladium-copper (Pd—Cu) alloy, a palladium-yttrium alloy, and a palladium-ruthenium alloy.

A38. The membrane module of any of paragraphs A1-A37, wherein at least one of the first hydrogen-selective membrane and the second hydrogen-selective membrane includes a/the Pd—Cu alloy, and further wherein the Pd—Cu alloy has a copper composition of at least one of at least 15 weight percent (wt %), at least 20 wt %, at least 25 wt %, at least 30 wt %, at least 35 wt %, at least 40 wt %, at least 45 wt %, at least 50 wt %, at most 60 wt %, at most 55 wt %, at most 53 wt %, at most 50 wt %, at most 45 wt %, at most 40 wt %, at most 35 wt %, at most 30 wt %, and at most 25 wt %.

A39. A fuel processor, comprising:
  a hydrogen-producing region configured to receive a feed stream and to produce a mixed gas stream therefrom; and
  a hydrogen purifier including the membrane module of any of paragraphs A1-A38, wherein the membrane module is configured to receive the mixed gas stream and to separate the mixed gas steam into a product hydrogen stream and a byproduct stream.

A40. The fuel processor of paragraph A39, wherein the hydrogen-producing region includes a reforming region.

A41. The fuel processor of any of paragraphs A39-A40, wherein the fuel processor further includes a feed stream delivery system configured to supply the feed stream to the hydrogen-producing region.

A42. A fuel cell system, comprising:
  the fuel processor of any of paragraphs A39-A41; and
  a fuel cell stack, wherein the fuel cell stack is configured to receive the product hydrogen stream from the fuel processor and to generate an electric current therefrom.

A43. The fuel cell stack of paragraph A42, wherein the fuel cell system further includes an energy-consuming device configured to receive the electric current from the fuel cell stack.

INDUSTRIAL APPLICABILITY

The membrane modules, hydrogen purifiers, fuel processors, and fuel cells disclosed herein are applicable to the hydrogen production, purification, and consumption industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A membrane module for hydrogen separation, the membrane module comprising:
   a plurality of membrane packs, wherein each membrane pack comprises:
   (i) a first hydrogen-selective membrane defining a first permeate face and an opposed first mixed gas face;
   (ii) a second hydrogen-selective membrane defining a second permeate face and an opposed second mixed gas face;
   (iii) a fluid-permeable support structure positioned between the first hydrogen-selective membrane and the second hydrogen-selective membrane such that the support structure physically contacts, and supports, at least a central region of the first permeate face and at least a central region of the second permeate face and also such that the central region of the first permeate face is spaced-apart from the central region of the second permeate face;
   (iv) a first permeate-side frame member interposed between the first hydrogen-selective membrane and the support structure such that the first permeate-side frame member physically contacts, and supports, a peripheral region of the first permeate face and a peripheral region of the support structure;
   (v) a second permeate-side frame member interposed between the second hydrogen-selective membrane and the support structure such that the second permeate-side frame member physically contacts, and supports, a peripheral region of the second permeate face and the peripheral region of the support structure;
   (vi) a first mixed gas-side frame member positioned to physically contact, and support, a peripheral region of the first mixed gas face; and
   (vii) a second mixed gas-side frame member positioned to physically contact, and support, a peripheral region of the second mixed gas face;
   wherein at least one of:
   (i) a thickness of the first permeate-side frame member is less than a thickness of the first mixed gas-side frame member; and
   (ii) a thickness of the second permeate-side frame member is less than a thickness of the second mixed gas-side frame member.

2. The membrane module of claim 1, wherein:
   (i) the first permeate-side frame member is configured to form a fluid seal between the peripheral region of the first permeate face and the peripheral region of the support structure; and
   (ii) the second permeate-side frame member is configured to form a fluid seal between the peripheral region of the second permeate face and the peripheral region of the support structure.

3. The membrane module of claim 1, wherein at least one of:
   (i) the first permeate-side frame member has a first permeate-side frame member density, and further wherein the first mixed gas-side frame member has a first mixed gas-side frame member density that is less than 90% of the first permeate-side frame member density; and
   (ii) the second permeate-side frame member has a second permeate-side frame member density, and further wherein the second mixed gas-side frame member has a second mixed gas-side frame member density that is less than 90% of the first permeate-side frame member density.

4. The membrane module of claim 3, wherein at least one of the first permeate-side frame member density and the second permeate-side frame member density is at least 1.5 g/cc and at most 1.8 g/cc, and further wherein at least one of the first mixed gas-side frame member density and the second mixed gas-side frame member density is at least 1.2 g/cc and at most 1.4 g/cc.

5. The membrane module of claim 1, wherein the support structure includes a screen structure that includes two fine mesh screens.

6. The membrane module of claim 5, wherein the two fine mesh screens include at least one plain weave fine mesh screen, wherein a diameter of a shute wire of the plain weave fine mesh screen is selected to provide less than a maximum desired amplitude of undulation within the first hydrogen-selective membrane and also within the second hydrogen-selective membrane, wherein the maximum desired amplitude of undulation is at most 100 micrometers.

7. The membrane module of claim 6, wherein the diameter of the shute wire of the plain weave fine mesh screen is at most 1.5 times the maximum desired amplitude of the undulation within the first hydrogen-selective membrane and also within the second hydrogen-selective membrane.

8. The membrane module of claim 5, wherein the two fine mesh screens include at least one Dutch weave fine mesh screen, wherein a diameter of a shute wire of the Dutch weave fine mesh screen is selected to provide less than a maximum desired amplitude of undulation within the first hydrogen-selective membrane and also within the second hydrogen-selective membrane, wherein the maximum desired amplitude of undulation is at most 100 micrometers.

9. The membrane module of claim 8, wherein a diameter of a shute wire of the Dutch weave fine mesh screen is at least 1.5 and at most 2.5 times the maximum desired amplitude of undulation within the first hydrogen-selective membrane and also within the second hydrogen-selective membrane, wherein the maximum desired amplitude of undulation is at most 100 micrometers.

10. The membrane module of claim 1, wherein the plurality of membrane packs includes a stack of membrane packs, and further wherein the membrane module includes:
(i) a corresponding feed plate assembly positioned between each adjacent pair of membrane packs in the stack of membrane packs;
(ii) a first end plate on a first end of the stack of membrane packs; and
(iii) a second end plate on a second end of the stack of membrane packs.

11. The membrane module of claim 10, wherein the membrane module further includes a compliance gasket, wherein the compliance gasket is configured to be compressed, upon assembly of the membrane module, to decrease a potential for over-compression of the membrane module, and further wherein the compliance gasket is at least one of:
(i) positioned between at least one adjacent pair of membrane packs; and
(ii) positioned between the stack of membrane packs and at least one of the first end plate and the second end plate.

12. The membrane module of claim 10, wherein the membrane module further includes:
(i) a supply manifold for supplying a mixed gas stream to a corresponding mixed gas region defined between adjacent membrane packs; and
(ii) an exhaust manifold for removing a byproduct stream from the corresponding mixed gas region;
wherein the corresponding feed plate assembly includes:
(i) a feed plate including at least one supply channel and at least one exhaust channel, wherein the feed plate is positioned between the stack of membrane packs and a selected end plate of the first end plate and the second end plate; and
(ii) a feed frame positioned between the feed plate and the selected end plate, the feed frame being formed around a periphery of the feed plate and forming an open volume between the feed plate and the selected end plate; and
further wherein the membrane module further includes a blocker gasket positioned between the feed plate and the selected end plate, the blocker gasket being configured to block fluid flow between the at least one supply channel and the at least one exhaust channel via the open volume.

13. The membrane module of claim 1, wherein a first thickness of the first hydrogen-selective membrane and a second thickness of the second hydrogen-selective membrane is at most 15 microns.

14. The membrane module of claim 1, wherein at least one of the first hydrogen-selective membrane and the second hydrogen-selective membrane is formed from at least one of a metal, a noble metal, palladium, a palladium alloy, a palladium-copper (Pd-Cu) alloy, a palladium-yttrium alloy, and a palladium-ruthenium alloy.

15. A fuel processor, comprising:
a hydrogen-producing region configured to receive a feed stream and to produce a mixed gas stream therefrom; and
a hydrogen purifier including the membrane module of claim 1, wherein the membrane module is configured to receive the mixed gas stream and to separate the mixed gas steam into a product hydrogen stream and a byproduct stream.

16. A membrane module for hydrogen separation, the membrane module comprising:
a plurality of membrane packs, wherein each membrane pack comprises:
(i) a first hydrogen-selective membrane defining a first permeate face and an opposed first mixed gas face;
(ii) a second hydrogen-selective membrane defining a second permeate face and an opposed second mixed gas face; and
(iii) a fluid-permeable support structure positioned between the first hydrogen-selective membrane and the second hydrogen-selective membrane such that the support structure physically contacts, and supports, at least a central region of the first permeate face and at least a central region of the second permeate face and also such that the central region of the first permeate face is spaced-apart from the central region of the second permeate face, wherein:
a) the support structure includes a screen structure that includes two fine mesh screens;
b) the two fine mesh screens include at least one of a plain weave fine mesh screen and a Dutch weave fine mesh screen; and
c) the at least one of the plain weave fine mesh screen and the Dutch weave fine mesh screen has a shute wire diameter that is selected to provide at most 100 micrometers of undulation within the first hydrogen-selective membrane and also within the second hydrogen-selective membrane.

17. The membrane module of claim 16, wherein the two fine mesh screens include the plain weave fine mesh screen, wherein the diameter of the shute wire of the plain weave fine mesh screen is at most 1.5 times a maximum desired amplitude of undulation.

18. The membrane module of claim 16, wherein the two fine mesh screens include the plain weave fine mesh screen, wherein the diameter of the shute wire of the plain weave fine mesh screen is at least 0.01 mm and at most 0.06 mm.

19. The membrane module of claim 16, wherein the two fine mesh screens include the plain weave fine mesh screen, wherein the plain weave fine mesh screen includes at least 150 shute wires per inch.

20. The membrane module of claim 16, wherein the two fine mesh screens include the Dutch weave fine mesh screen, wherein the Dutch weave fine mesh screen includes a Dutch twill weave fine mesh screen.

21. The membrane module of claim 16, wherein the two fine mesh screens include the Dutch weave fine mesh screen, wherein the diameter of the shute wire of the Dutch weave fine mesh screen is at least 1.5 and at most 2.5 times the maximum desired amplitude of undulation within the first hydrogen-selective membrane and also within the second hydrogen-selective membrane.

22. The membrane module of claim 16, wherein the screen structure further includes a coarse planar mesh screen positioned between the two fine mesh screens, wherein the coarse planar mesh screen is formed from a coarse wire having a coarse wire diameter, wherein the two fine mesh screens are formed from a fine wire having a fine wire diameter, and further wherein the coarse wire diameter is at least 2 times larger than the fine wire diameter.

23. The membrane module of claim 16, wherein each membrane pack further includes:
(i) a first permeate-side frame member interposed between the first hydrogen-selective membrane and the support structure such that the first permeate-side frame member physically contacts, and supports, a peripheral region of the first permeate face and a peripheral region of the support structure;

(ii) a second permeate-side frame member interposed between the second hydrogen-selective membrane and the support structure such that the second permeate-side frame member physically contacts, and supports, a peripheral region of the second permeate face and the peripheral region of the support structure;

(iii) a first mixed gas-side frame member positioned to physically contact, and support, a peripheral region of the first mixed gas face; and (iv) a second mixed gas-side frame member positioned to physically contact, and support, a peripheral region of the second mixed gas face;

wherein at least one of:

(i) a thickness of the first permeate-side frame member is less than a thickness of the first mixed gas-side frame member; and (ii) a thickness of the second permeate-side frame member is less than a thickness of the second mixed gas-side frame member.

24. The membrane module of claim 16, wherein the plurality of membrane packs includes a stack of membrane packs, and further wherein the membrane module includes:

(i) a corresponding feed plate assembly positioned between each adjacent pair of membrane packs in the stack of membrane packs;

(ii) a first end plate on a first end of the stack of membrane packs; and (iii) a second end plate on a second end of the stack of membrane packs.

25. The membrane module of claim 24, wherein the membrane module further includes a compliance gasket, wherein the compliance gasket is configured to be compressed, upon assembly of the membrane module, to decrease a potential for over-compression of the membrane module, and further wherein the compliance gasket is at least one of:

(i) positioned between at least one adjacent pair of membrane packs; and (ii) positioned between the stack of membrane packs and at least one of the first end plate and the second end plate.

26. The membrane module of claim 24, wherein the membrane module further includes:

(i) a supply manifold for supplying a mixed gas stream to a corresponding mixed gas region defined between adjacent membrane packs; and (ii) an exhaust manifold for removing a byproduct stream from the corresponding mixed gas region;

wherein the corresponding feed plate assembly includes:

(i) a feed plate including at least one supply channel and at least one exhaust channel, wherein the feed plate is positioned between the stack of membrane packs and a selected end plate of the first end plate and the second end plate; and (ii) a feed frame positioned between the feed plate and the selected end plate, the feed frame being formed around a periphery of the feed plate and forming an open volume between the feed plate and the selected end plate; and further wherein the membrane module includes a blocker gasket positioned between the feed plate and the selected end plate, the blocker gasket being configured to block fluid flow between the at least one supply channel and the at least one exhaust channel via the open volume.

27. The membrane module of claim 16, wherein a first thickness of the first hydrogen-selective membrane and a second thickness of the second hydrogen- selective membrane is at most 15 microns.

28. The membrane module of claim 16, wherein at least one of the first hydrogen-selective membrane and the second hydrogen-selective membrane is formed from at least one of a metal, a noble metal, palladium, a palladium alloy, a palladium-copper (Pd-Cu) alloy, a palladium-yttrium alloy, and a palladium-ruthenium alloy.

29. A fuel processor, comprising:

a hydrogen-producing region configured to receive a feed stream and to produce a mixed gas stream therefrom; and a hydrogen purifier including the membrane module of claim 16, wherein the membrane module is configured to receive the mixed gas stream and to separate the mixed gas steam into a product hydrogen stream and a byproduct stream.

30. The membrane module of claim 16, wherein each of the two fine mesh screens has a shape, wherein at least the central region of the first permeate face conforms to the shape of one of the two fine mesh screens, and at least the central region of the second permeate face conforms to the shape of the other of the two fine mesh screens.

31. The membrane module of claim 16, wherein one of the two fine mesh screens is positioned within the fluid-permeable support structure nearest to the first permeate face, and the other of the two fine mesh screens is positioned within the fluid-permeable support structure nearest to the second permeate face.

* * * * *